(12) United States Patent
Borysenko et al.

(10) Patent No.: US 9,196,075 B2
(45) Date of Patent: Nov. 24, 2015

(54) ANIMATION OF COMPUTER-GENERATED DISPLAY COMPONENTS OF USER INTERFACES AND CONTENT ITEMS

(75) Inventors: Michael Ivan Borysenko, Redmond, WA (US); Tyler Robert Adams, Kirkland, WA (US); Barry Christopher Allyn, Snohomish, WA (US); Anthony Joseph Beeman, Woodinville, WA (US); Warren Leung, Bellevue, WA (US); Eric Wyld Lieberman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 408 days.

(21) Appl. No.: 13/295,478

(22) Filed: Nov. 14, 2011

(65) Prior Publication Data

US 2013/0120401 A1    May 16, 2013

(51) Int. Cl.
*G06T 13/80* (2011.01)

(52) U.S. Cl.
CPC ............. *G06T 13/80* (2013.01); *G06T 2213/08* (2013.01)

(58) Field of Classification Search
USPC ........................................................ 345/473
See application file for complete search history.

(56) References Cited

U.S. PATENT DOCUMENTS

| | | |
|---|---|---|
| 7,168,048 B1 | 1/2007 | Goossen et al. |
| 7,302,648 B1 | 11/2007 | Brunner et al. |
| 7,703,036 B2 | 4/2010 | Satterfield et al. |
| 2003/0134632 A1 | 7/2003 | Loughran |
| 2004/0189669 A1* | 9/2004 | David et al. .............. 345/619 |
| 2005/0088443 A1 | 4/2005 | Blanco et al. |
| 2006/0184894 A1* | 8/2006 | Daniels et al. ........... 715/783 |

(Continued)

FOREIGN PATENT DOCUMENTS

| | | |
|---|---|---|
| CN | 1427373 A | 7/2003 |
| CN | 101714088 A | 5/2010 |

(Continued)

OTHER PUBLICATIONS

"WPF Interoperation: "Airspace" and Window Regions Overview", Retrieved on: Sep. 14, 2011, http://msdn.microsoft.com/en-us/library/aa970688%28VS.90%29.aspx, 4 pages.

(Continued)

*Primary Examiner* — Daniel Hajnik
(74) *Attorney, Agent, or Firm* — Steve Crocker; Danielle Johnston-Holmes; Micky Minhas

(57) ABSTRACT

Animation of computer-generated display components of user interfaces and content items is provided. An animation application or engine creates images of individual display components (e.g., bitmap images) and places those images on animation layers. Animation behaviors may be specified for the layers to indicate how the layers and associated display component images animate or behave when their properties change (e.g., a movement of an object contained on a layer), as well as, to change properties on layers in order to trigger animations (e.g., an animation that causes an object to rotate). In order to achieve high animation frame rates, the animation application may utilize three processing threads, including a user interface thread, a compositor thread and a rendering thread. Display behavior may be optimized and controlled by utilizing a declarative markup language, such as the Extensible Markup Language, for defining display behavior functionality and properties.

20 Claims, 21 Drawing Sheets

(56) References Cited

U.S. PATENT DOCUMENTS

| | | |
|---|---|---|
| 2006/0274070 A1 | 12/2006 | Herman et al. |
| 2006/0274080 A1 | 12/2006 | Lee et al. |
| 2007/0233377 A1 | 10/2007 | Salay et al. |
| 2007/0252834 A1 | 11/2007 | Fay |
| 2008/0001968 A1 | 1/2008 | Krueger |
| 2008/0034292 A1* | 2/2008 | Brunner et al. ............... 715/700 |
| 2010/0171759 A1 | 7/2010 | Nickolov et al. |
| 2010/0214313 A1* | 8/2010 | Herman et al. ............... 345/593 |
| 2011/0001753 A1 | 1/2011 | Frej et al. |
| 2011/0179368 A1 | 7/2011 | King et al. |
| 2011/0214079 A1 | 9/2011 | Young |
| 2012/0188246 A1 | 7/2012 | Cheung et al. |
| 2014/0300647 A1 | 10/2014 | Villegas et al. |

FOREIGN PATENT DOCUMENTS

| | | |
|---|---|---|
| CN | 101882321 A | 11/2010 |
| CN | 101893980 A | 11/2010 |
| WO | 2011100599 A2 | 8/2011 |

OTHER PUBLICATIONS

Alexa, et al., "An Animation System for User Interface Agents", In Proceedings of WSCG, Feb. 5-9, 2001, pp. 154-160.

"Step by Step Tutorials for Microsoft Word 2002 Accessibility Options", Retrieved on: Sep. 14, 2011, http://download.microsoft.com/download/b/d/5/bd515214-0728-4a54-9625-ab3f198cf448/Word2002.doc, 59 pages.

"Performance Considerations in Applications for Windows Phone", Retrieved on: Sep. 12, 2011, http://msdn.microsoft.com/en-us/library/ff967560(v=vs.92).aspx, 23 pages.

Euh, et al., "A Low-Power Content-Adaptive Texture Mapping Architecture for Real-Time 3D Graphics", In Proceedings of the 2nd International Conference on Power-aware Computer Systems, 2002, 11 pages.

International Search Report and Written Opinion for PCT/US2012/064260 mailed Feb. 28, 2013.

"First Office Action and Search Report Issued in Chinese Patent Application No. 201210455485.4", Mailed Date: Mar. 4, 2015, 12 pages.

"Second Office Action and Search Report Issued in Chinese Patent Application No. 201210455485.4", Mailed Date: Apr. 29, 2015, 13 pages.

Word 2007 Tutorial—10 Working with Pictures, Aug. 3, 2009, https://www.youtube.com/watch?v=Jn3G2GTINa4.

"Third Office Action and Search Report Issued in Chinese Patent Application No. 201210455485.4", Mailed Date: Sep. 25, 2015, 9 Pages.

* cited by examiner

ANIMATION OF COMPUTER-GENERATED DISPLAY COMPONENTS OF USER INTERFACES AND CONTENT ITEMS

BACKGROUND

With the advent of computing, user interfaces have been developed for allowing users to interact with electronic content and underlying software application functionality. As computing devices and display functionality become more advanced, users expect graphical displays to be both functionally efficient and visually pleasing. For example, if a user desires to move an electronic object (e.g., a photograph, chart, piece of text, or the like) from one location to another on a display screen, the user expects an efficient movement of the object, and the user also has come to expect a visually pleasing (or even entertaining) movement of the object. As another example, if a user navigates between places within a user interface, the user expects a fluid movement between these spaces. Provision of such graphical display functionality requires substantial processing and display animation capability. It is with respect to these and other considerations that the present invention has been made.

SUMMARY

Embodiments of the present invention solve the above and other problems by providing animation of computer-generated display components of user interfaces and content items. According to embodiments, an animation application (also referred to herein as an animation engine) for animating computer-generated display components of graphical user interfaces (e.g., buttons, controls, tool bars, search functions, etc.), as well as, display components of various content items (e.g., text, images, photographs, charts, etc.).

According to one embodiment, the animation application creates images of individual display components (e.g., bitmap images) and places those images on animation layers. Animation behaviors may be specified for the layers to indicate how the layers and associated display component images animate or behave when their properties change (e.g., an animation behavior may be added to a layer to specify the speed, duration, and acceleration that should be used to move the layer when its position property changes), as well as, to change properties on layers in order to trigger animations (e.g., an animation that causes an object to rotate, vibrate, resize, etc.). In order to achieve high frame rates associated with display component movement or other animation, the animation application may utilize three processing threads, including a user interface (UI) thread, a compositor thread and a rendering thread. According to one embodiment, display behavior may be optimized and easily controlled by utilizing a declarative markup language, such as the Extensible Markup Language, for defining display behavior functionality and properties. Thus, a variety of functionally efficient and visually pleasing display behavior for displayed objects may be achieved.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
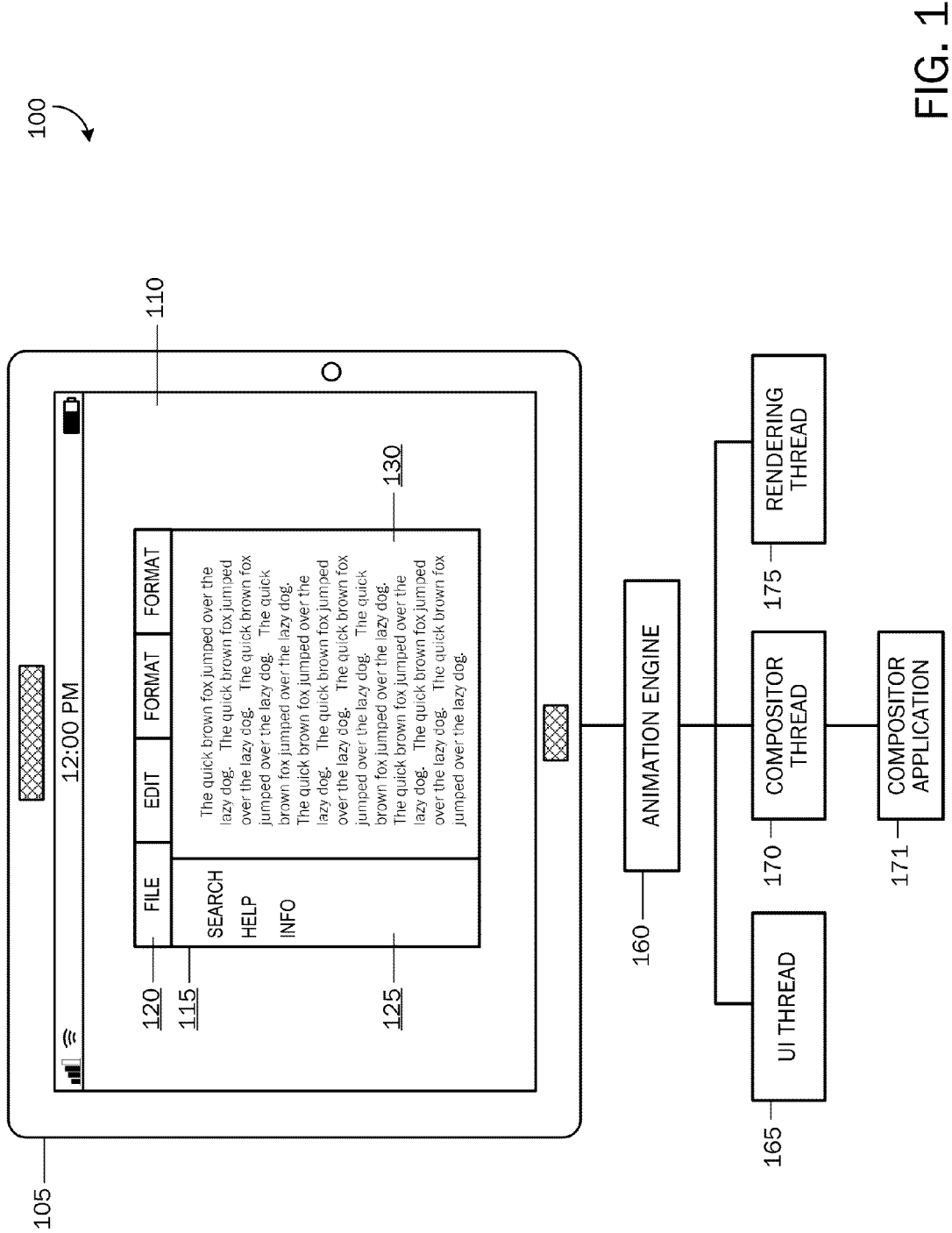
FIG. 1 illustrates a system architecture for animation of computer-generated display components of user interfaces and content items.

As briefly described above, embodiments of the present invention are directed to animation of display components of computer-generated user interfaces and content items. The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

According to embodiments, when a display component (also referred to herein as a "texture") of a graphical user interface or content item is animated (e.g., moved, rotated, resized, stretched, and the like) it is desirable that a smooth and visually pleasing animation function is provided. For example, if using a word processing or other similar application, a user may launch an instance of a functionality toolbar for accessing one or more functionality buttons or controls. A desirable animation provided in accordance with embodiments of the invention may include smoothly sliding the toolbar into position while simultaneously smoothly moving user content (e.g., a document) down underneath the toolbar as opposed to abruptly displaying the toolbar in a position above the content. For another example, if a user changes from an electronic mail function to a calendar function of a multi-function application, a desirable animation may include sliding a mail interface out of view while simultaneously sliding a calendar interface into view.

As will be described in detail below, according to embodiments, an animation application or engine creates images of individual display components (e.g., bitmap images) and places those images on animation layers. Animation behaviors may be specified for the layers to indicate how the layers and associated display component images animate or behave when their properties change (e.g., a movement of an object contained on a layer), as well as, to change properties on layers in order to trigger animations (e.g., an animation that causes an object to rotate). In order to achieve high animation frame rates, the animation application may utilize three processing threads, including a user interface thread, a compositor thread and a rendering thread. Display behavior may be optimized and controlled by utilizing a declarative markup language, such as the Extensible Markup Language, for defining display behavior functionality and properties.

FIG. 1 illustrates a system architecture for animation of computer-generated display components of user interfaces and content items. The system 100 includes a computer display screen 105 having a computer display screen surface 110 for displaying one or more graphical display components associated with user content and/or software application user interface presentations. According to embodiments, the computer display screen 105 is illustrative of a computer display screen associated with a variety of suitable computing devices, described below with reference to FIGS. 18 through 20.

An example software application user interface and example associated user content are displayed on the display surface 110. The user interface 115 is illustrative of user interfaces and associated user content enabled by a variety of software applications, for example, word processing applications, spreadsheet applications, slide presentation applications, electronic mail applications, notes applications, calendaring applications, and the like. That is, the user interface 115 is illustrative of any graphical display components that may be displayed onto a computer-enabled display surface 110 for review and use according to associated software application functionality. As illustrated in FIG. 1, the user interface 115 is illustrative of a word processing application user interface having a plurality of functionality controls 120, a service pane 125, and a user content display area 130. As should be understood, the illustrated user interface 115 is for purposes of example only and is not limiting of the vast number and types of graphical display components that may be displayed and managed according to embodiments of the invention described herein.

The animation engine 160 is illustrative of a software application that enables animation of display components of software application user interfaces (UI) (e.g., buttons, controls, search functions, help functions, menus, toolbars, etc.) and user content (e.g., documents, photographs, images, charts, etc.) using behavioral-based animation. The animation engine 160 enables the creation of display layers onto that may be placed display images such as bitmaps representing various display components. In addition, the animation engine 160 is operative to specify animation behaviors that indicate how the display layers should animate when their properties change, and to change properties on layers in order to trigger animations.

Referring still to FIG. 1, in order to enable smooth animations with high animation frame rates, the animation engine uses three animation processing threads 165, 170, 175. The UI thread 165 is a processing thread with which the display layers are created and display images (e.g., bitmaps) are added. In addition, the UI thread 165 is responsible for processing animation behaviors added to layers (e.g., object movements, sizing, reaction to movement of other objects, and the like) and for changing properties on layers in order to schedule animations. For example, for a word processing application, the UI thread 165 may be responsible drawing a document on a display layer, placing a cursor on the document, and then setting properties on the cursor to allow movement of the cursor around the document.

The compositor thread 170 is a processing thread responsible for receiving display layers and property changes from the UI thread. This compositor thread flattens all layers that are not animating into one layer and performs the processing required to animate the layers (e.g., positioning data for moving a cursor on a word processing document). Once the compositor thread determines all of the information required to schedule an animation it places this information into a communication (also referred to herein as a "CompNode") which is sent to the rendering thread 175.

The rendering thread 175 receives the communications from the compositor thread 170 which includes all of the layers that are being animated and information on how to animate these layers. Since the computation to determine how to animate these layers is computed on the compositor thread, the rendering thread is not blocked by determining this information and is free to animate at high frame rates. That is, because of the processing performed by the compositor thread, the rendering thread is freed up to draw display components to the display screen 110 quickly for playing the associated animation at a higher frame rate.

Figure 2:
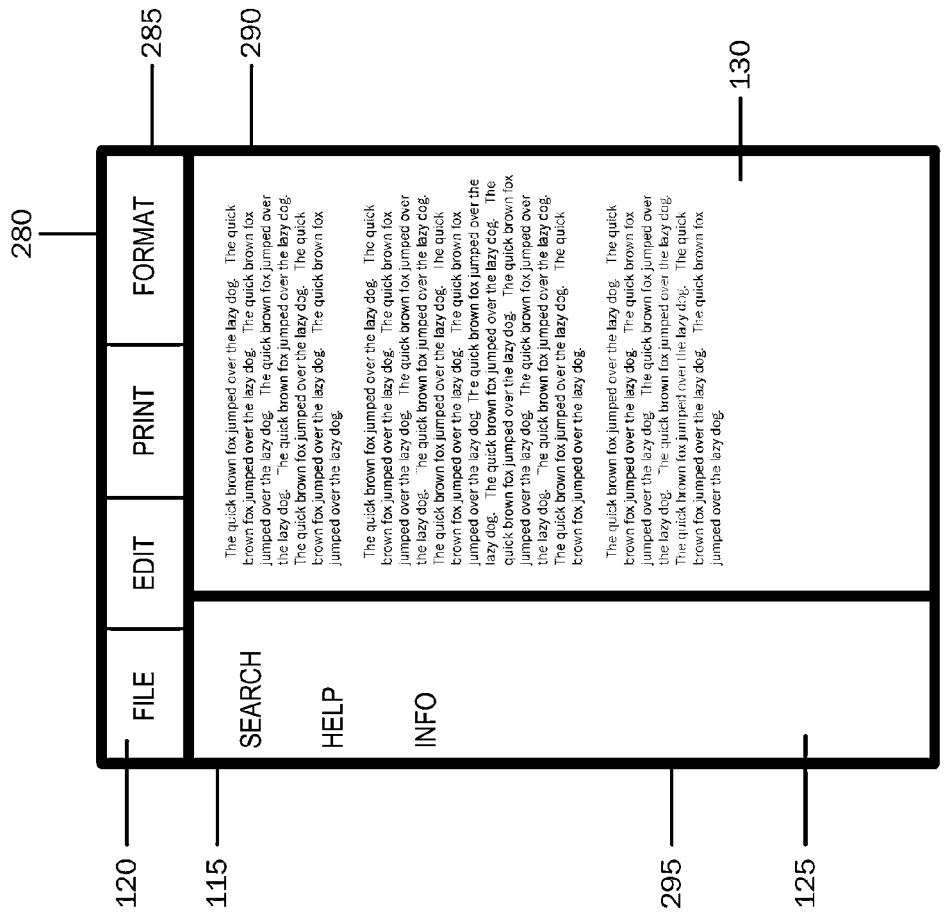
FIG. 2 is a simplified block diagram of an example software application user interface showing a number of display frames or windows in which application functionality and user content display components are contained and managed.

For purposes of describing the animation functionality described herein, FIG. 2 illustrates an example displayed word processing application user interface associated with a displayed word processing document where each of the displayed user interface components contains a plurality of display components. For example, the user interface 115 may be illustrative of a word processing document. Each display component displayed on a computer screen surface 110 may be displayed as a single display object or as a collection of display objects. According to one embodiment, content items may be displayed in a display frame or window in which a collection of display components may be organized for providing a desired display of software application functionality and associated user content. Referring to FIG. 2, the user interface 115 includes a top level display frame or window 280 and includes a number of sub or child display frames or windows 285, 290, 295. For example, a collection of software application functionality buttons or controls 120 may be displayed in the child display frame or window 285, user content 130 may be displayed in a sub or child display frame or window 290, and functionality and content associated with a service pane 125 (e.g., search functions, help functions, information functions, etc.) may be displayed in a sub or child display frame or window 295. As should be appreciated, the example word processing user interfaces and associated user data illustrated in FIG. 2 are for purposes of example and illustration only and are not limiting of the vast number and types of user interfaces and associated user data that may be displayed and that may be managed according to embodiments of the present invention.

As briefly described above, in order to generate, render and animate display components as illustrated in FIG. 2 (e.g., animation of the movement of a cursor from the functionality buttons/controls frame 285 to the content frame 290), the animation engine 160, via the processing threads 165, 170, 175 creates display layers, renders (paints) visual display components (elements) onto layers, composites layers together where required, and animates the layers for providing the desired animation. According to one embodiment, the animation engine 160 includes a compositor application 171 that operates as part of the compositor thread 170 that brings visual display components (textures) from different sources together in order to create a combined scene that may be animated. Consider for example the functionality buttons/controls bar 120, illustrated in FIGS. 1, 2. Every button or control may be an individual layer. The UI thread creates all of these individual layers and places all the display buttons (display components) on the layers. The UI thread then sends the layers over to the compositor thread where the compositor application 171 assembles all the layers together into a scene representing the tool bar and associated buttons/controls 120.

More particularly, a scene is an object that can be used to create layer hosts (described below), display layers, display components (textures) and other compositor application objects. Each UI thread 165 has one scene that represents the state of the compositor application 171 associated with that thread. The scene can provide functions that effect all animations that occur on the scene's thread. Animation engine 160 clients (e.g., applications requiring animation) can create one scene object for every thread that contains UI they want to animate. Each UI thread may contain multiple display frames or windows 280, 285, 290, 295 as illustrated in FIG. 2. An "overall scene" 280 may consists of all managed display frames or windows on the thread.

In addition, a scene may be used for batching animations to be scheduled concurrently, for example, an animation of two items displayed in a "to do" list. As mentioned above, an animation property may be set on a given layer for causing the layer to animate. An example of batching animations may include repositioning display components on layers where one display component is moved to one position and then the other display components have to move out of the way on the layer or respond accordingly. In order to accomplish these example moves the positions of the display components are set and batching animation allows for setting a number of different properties for the positions of all these different layers containing the different display components so that all layers may be animated at the same time. The scene may also be used for enabling and disabling all animations in the scene and for receiving notifications about animations within the scene. According to embodiments, animations may be disabled at the scene level (i.e., disable all animations in a scene), at the layer host level (i.e., disable all animations associated with a layer host) and on an individual basis.

Each of the display frames or windows 280, 285, 290, 295 in which display components associated with software application functionality (e.g., buttons or controls) or in which user data (e.g., data, images, and the like) is displayed may be managed via a management component, sometimes referred to herein as a layer host. According to embodiments, a layer host is an object that takes over rendering for display components contained in a display frame or window 280, 285, 290, 295. The layer host may also create root layers (described below). There may be multiple layer hosts in a scene. Referring back to FIG. 2, according to embodiments, one layer host may be created for every display frame or window 280, 285, 290, 295 to enable the animation engine to cause the rendering of all the display components in each frame of the user interface. To allow the layer host to manage each frame or window, including shutdown, window size, window rendering (paint), window visibility; position changes for displayed components or textures and other editing functions acting on the frame or window, the frame/window and the associated layer host must be created on the same thread.

According to embodiments, on creation, a layer host may automatically create a root layer that matches the position and size of the layer host's client's area (e.g., a display frame or window being managed by the layer host) that is valid for the life of the layer host. The layer host provides a method to retrieve its associated root layer. This allows the animation engine 160 to add textures to the root layer or to add child layers to the root layer. The child layers can be used to animate the contents within a display frame or window. Any layers created within a display frame or window will be clipped to the bounds of that display frame or window. If the layer moves outside the bounds of the display frame or window it will not be visible. Additional discussion of clipping is set out below.

As described herein, a layer or display layer is an object or node in a composition tree (described below) that can be animated. According to embodiments, display components or textures are placed on layers for animation. That is the display components are properties of the layers onto which they are placed that represent the object that will be rendered to the display screen. In some cases, the display components are in the form of bitmaps that may be rendered to a display screen as a representation of the associated display component. For example, a "print" button may be displayed as a bitmap and may be a property of a layer contained in a toolbar frame 285 of a word processing application user interface, as illustrated in FIG. 2. Thus, the "print" button may be a bitmap rendered onto a child layer of the frame's 285 root layer.

By default, layers may be transparent where they have no display components or textures. A transparent layer (having no applied display components) may be used to manager other layers. That is, a transparent layer may be used as a parent layer to hold one or more child layers (e.g., a transparent layer onto which is placed two button layers). This allows for manipulation of the parent layer (e.g., movement of the parent layer) for causing animation of the included child layers. For example, movement of a transparent parent layer holding two child button layers allows for movement of both child button layers simultaneously. For another example, if a user draws two shapes in a word processing document, the two shapes could be drawing onto individual child layers which in turn could be place onto a transparent parent layer. Then, animation (e.g., movement) of the parent layer would move both child layers and associated shapes together.

Figure 3:
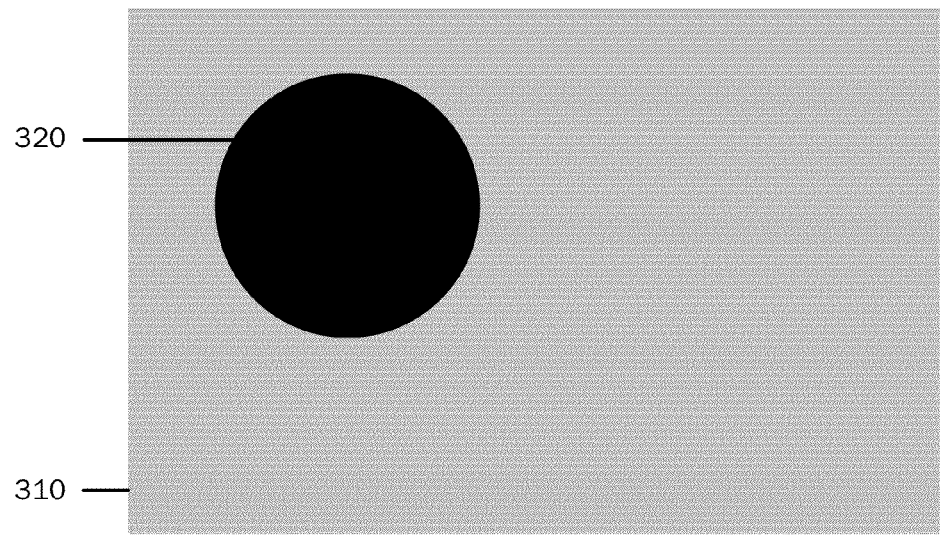
FIG. 3 is a simplified block diagram illustrating animation associated with the movement of one display component relative to another display component.
Figure 3:
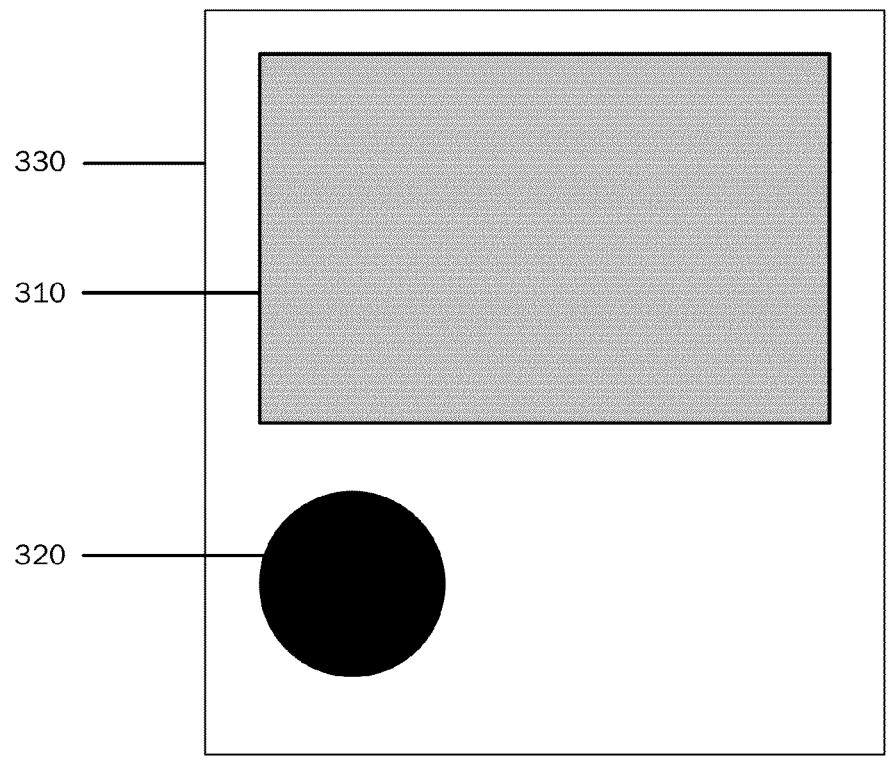

As set out above, once a layer host and root layer have been created child layers may be defined that may be animated relative to their parents. The animation engine does not impose a limit on the number of layers that can be created in a scene. Referring then to FIG. 3, consider for example the animation of a black circle 320 across a grey background 310. For the circle/background combination illustrated at the top of FIG. 3, to animate the circle moving from left to right, two layers are required, including one for the circle 320 and one for the square grey background 310. In this case the grey background 310 may be drawn to the root layer, so again it becomes the size of the layer host. And then the second layer may just be the size of the circle 320 with a texture of the black circle drawn onto it. Then, by repositioning the layer containing the circle 320, the circle 320 appears to move across the grey background. According to embodiments, the layer containing the black circle 320 may have animation properties, for example, dictating the speed, duration, and acceleration of the move of the layer 320 across the background 310. For example, a property may be applied requiring the circle to move from a first position to a second position in 200 milliseconds, including acceleration during the move. For the circle/background combination 330 illustrated at the bottom of FIG. 3, the grey background 310 may be drawn onto the root layer which is created automatically when a layer host is created. A second layer will need to be created that the circle 320 may be drawn onto.

A composition tree is a tree of layers in a single layer host representing what the compositor will render into the display frame or window associated with the layer host. There may be multiple composition trees inside a given scene because a scene may contain multiple layer hosts. A layer's position in a composition tree represents the order it will be rendered to the screen, unless the order is otherwise specified for a layer. Tree is painted with a preorder traversal.

According to embodiments, the ordering in which a layer is rendered to screen (also referred to herein as a z-order) dictates both positioning and timing of rendering between parent and child layers. For example, child layers are always rendered on top of their parent layers and child layers of the same parent with high indexes will render on top of children with lower indexes. That is, indexes may be applied to child layers to dictate the order in which they are rendered to screen relative to other child layers of the same parent layer. According to embodiments, layers may have an ordering property (e.g., a z-order) which if set may override the layer's order based on its index. If two layers with the same parent are given the same z-order, they are rendered by index, where the lower indexed child layer is rendered below a higher indexed child layer. If perspective is enabled, layers may also have a z-position dictating depth of one layer relative to another layer. Z-position may override z-order for child layers that have the same parent.

Figure 4:
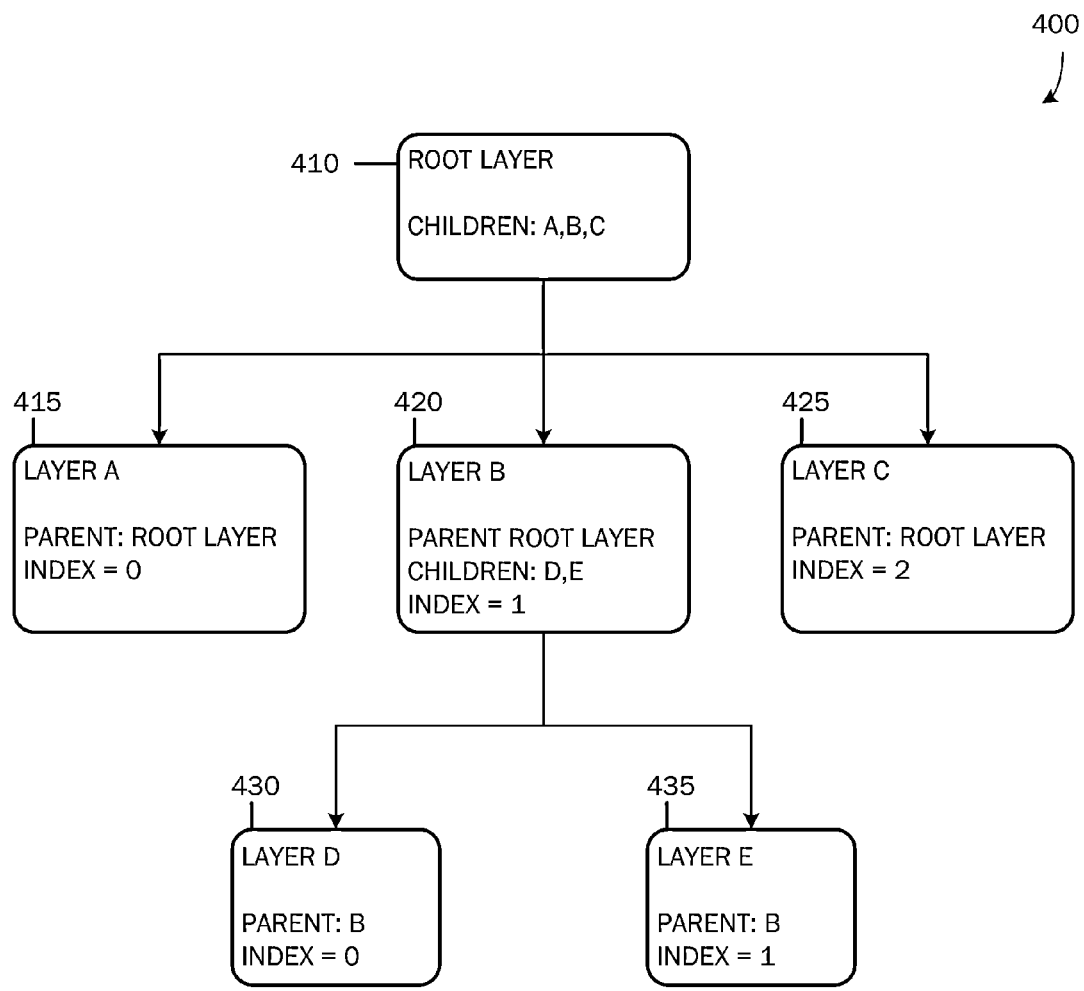
FIG. 4 is a simplified block diagram illustrating an animation composition tree showing relationships between a root display layer and a number of associated parent and child display layers.

FIG. 4 is a simplified block diagram illustrating an animation composition tree showing relationships between a root display layer and a number of associated parent and child display layers. The tree 400 represents the various layers that will be rendered to screen by the compositor application 171. The root layer 410 is at the top of the composition tree and may have child layers, but will not have a parent layer. The child layers 415, 420, 425 of the root layer 410 may include one or more child layers. In the case illustrated in FIG. 4, layer 420 has two child layers 430, 435. When the parent layers move, their child layers will move with them. Child layers, such as child layers 430, 435, may be added to any layer in the composition tree. Child layers are positioned and moved relative to parent layers in the composition tree. As described above, when the child layers are added to a parent layer they may receive an index starting at an index of zero (0) to dictate their rendering relative to other child layers. As illustrated in FIG. 4, layers A (415), B (420), and C (425) are child layers of the root layer 410 and have indexes of 0, 1 and 2, respectively. Thus, the layers A, B, and C will be rendered in sequential order owing to the applied indexes. Similarly the layers D (430) and E (435) are child layers of the parent layer B (420) and will be rendered immediately after the rendering of the parent layer B and in a rendering order of layer D first, followed by layer E.

An example of the forgoing may include the functionality buttons 120 in the display frame 280, illustrated in FIG. 2. A root layer may be associated with the display frame 280 and may be managed by a layer host. Each button "file," "edit," "print," and "format" may be a child layer of the root layer and may have indexes of 0 for "file," 1 for "edit, 2 for "print," and 3 for "format," respectively. Thus, when the display frame 280 is rendered, the "file," "edit, "print," and "format" buttons will be rendered in sequential order owing to their respective indexes.

Figure 5:
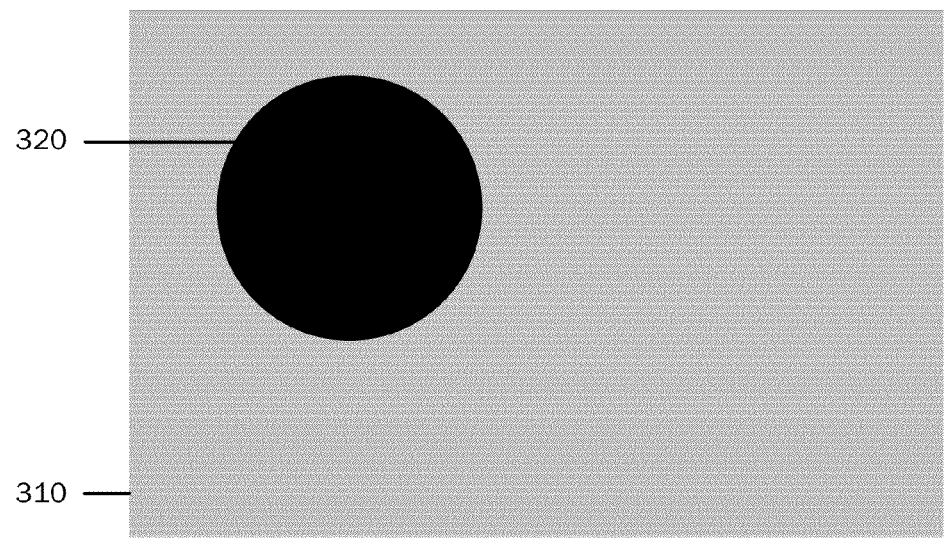
FIG. 5 is a simplified block diagram illustrating animation associated with the movement of one display component relative to another display component.
Figure 5:
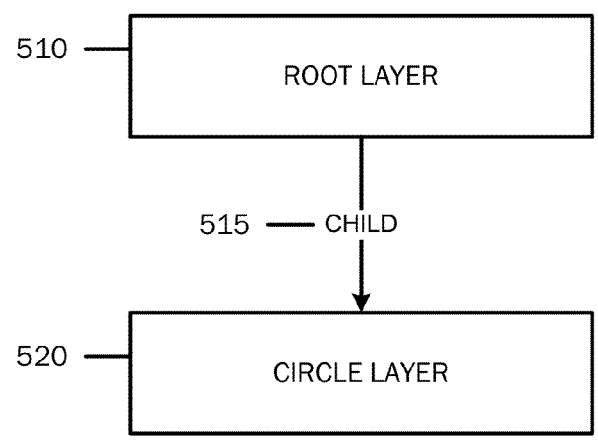

Referring to FIG. 5, consider another example of animating a black circle 320 across a grey background 310. In this example the grey background 310 could be placed on the root layer 510 and the black circle 320 could be placed on a child layer 520 of the root layer. Then the black circle may be positioned and moved relative to the root layer based on positioning order and movement ordering as described above. According to embodiments, a number of methods may be applied to layers for managing positioning and movement of layers relative to each other. The following is a listing of a number of methods that may be applied to layers. As should be appreciated, the following example methods are not exhaustive of a vast number of methods that may be developed and that may be applied to layers for positioning, moving, adding, removing and for getting information on layers.

An AddLayer method adds a specified layer as a child to the layer from which the method was called. For example calling AddLayer to layer B, illustrated in FIG. 4, will add a child layer to B at index 2. A RemoveLayer method removes a specified child layer from the layer from which it was called. This layer will be removed from the composition tree and deleted. The method provides the option to flatten display components or textures contained in the removed layer to its parent. An InsertLayerAtIndex method inserts a child layer to the layer from which the method was called at the specified index. For example, calling InsertLayerAtIndex 1 to layer B, illustrated in FIG. 4, would add a child layer to B at index 1 between layers D and E. Layer E's index would become 2. An InsertLayerAfter method inserts a layer after the specified layer or at the beginning if the specific layer does not exist. An InsertLayerBefore method inserts the layer before the specified layer or at the end if the specific layer does not exist. A GetChildLayerCount method returns the number of children of a layer. A GetLayer method returns the child layer at the specified index. A GetParent method returns the parent of a layer. A GetLayerHost method returns the layer host for the layer.

Referring still to FIG. 4, according to embodiments, at any given moment in time, the current state of the compositor's layer tree 400 is unknown to the associated UI thread 165. So, the layer tree may not yet be represented by the compositor application 171. Method calls to the layer tree, as set out above, will eventually be reflected by the compositor application 171 unless later calls to the layer tree interrupt them. For example, if a method call resizes a layer, the calling layer can expect that it will eventually resize to specified size, unless another UI-side method call sizes it to a different size, hides it, destroys it, removes its relationship to its current parent, or otherwise interrupts the command. The UI thread 165 that maintains ownership of an entire tree of layers has authority over what the compositor application 171 should be compositing, but the order of accomplishment of a given call may be altered or interrupted. According to embodiments, this allows the UI thread 165 to be unblocked to allow a user to click or otherwise interact with the display screen at another location even though the animation is playing. Thus, by interrupting the state, the click or other interaction by the user may be accomplished at the other location. In such a case, the currently running animation is overridden and the new property values are followed.

As described herein, display and animation of user interface and user content components, for example, buttons, text boxes, text items, charts, photographs, images and the like is accomplished by placing display components or texture onto layers for rendering onto a display screen. If a layer is rendered to a display screen without an included display component, then the layer is transparent. A layer without a display component or texture may be used to group, transform, and clip child layers.

Display components or textures placed onto layers for rendering may be in a number of forms and according to a number of formats. For example, display components may be bitmaps created and formatted according to a number of formats, a solid color fill, or a gradient. Gradient components or textures may be a linear or radial fill. The same display component or texture may be set to multiple different layers, and the display components may be scaled up/down to fit the size of a layer. According to embodiments, the animation engine 160 may receive for display and animation display components or textures created by different applications and according to different formats. That is, if the animation engine receives one object from one software application (e.g., a spreadsheet application) that operates according to one rendering technology and a second object from a second software application (e.g., a word processing application), the animation engine may convert both objects to a rendering technology in use by the animation engine 160 for deposit onto respective layers for rendering by the animation engine.

Figure 6:
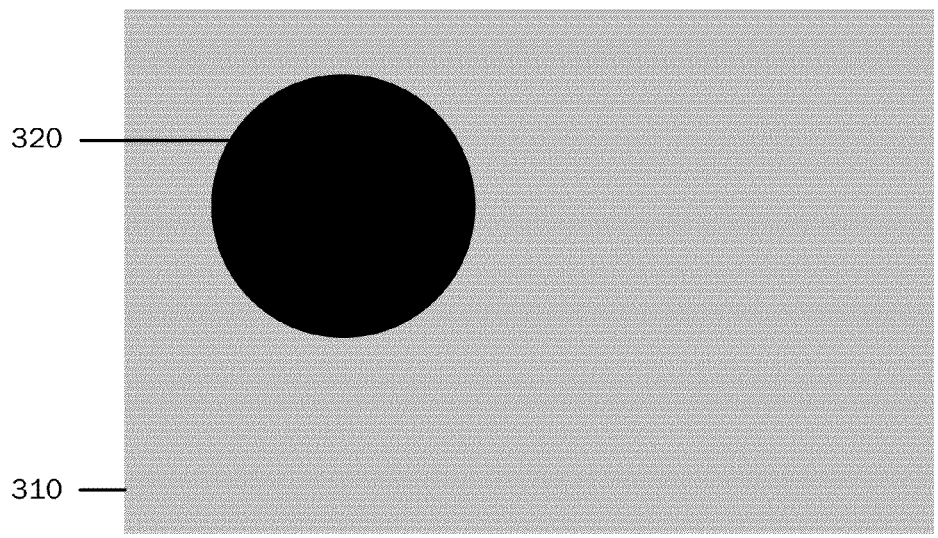
FIG. 6 is a simplified block diagram illustrating animation associated with the movement of one display component relative to another display component.
Figure 6:
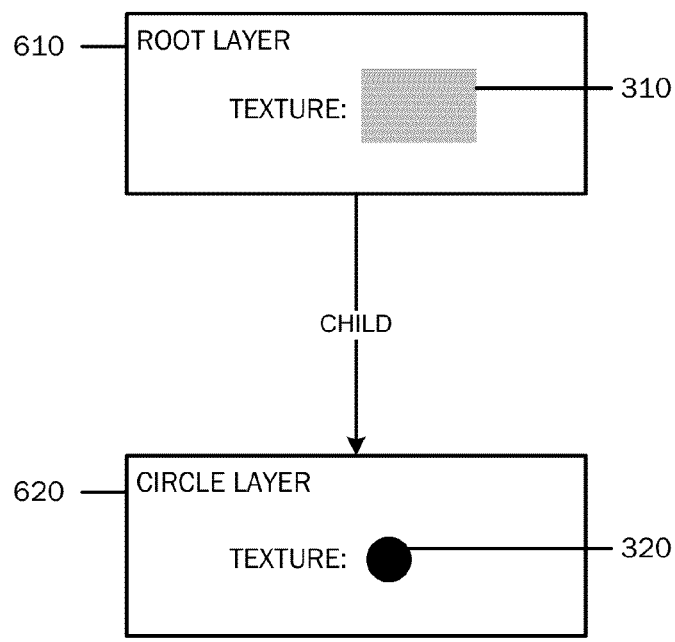

Referring now to FIG. 6, consider an example animation where a black circle 320 is moved across a grey background 310. The texture property for the grey background 310 is set on the root layer 610 and the texture property for the black circle 320 is set on the child layer 620. According to embodiments, display components or textures do not have thread affinity which means a display component may be created on one UI thread 160 and may be used on another UI thread 160. However, according to one embodiment, a display component may not be used by multiple threads at the same time.

Figure 7:
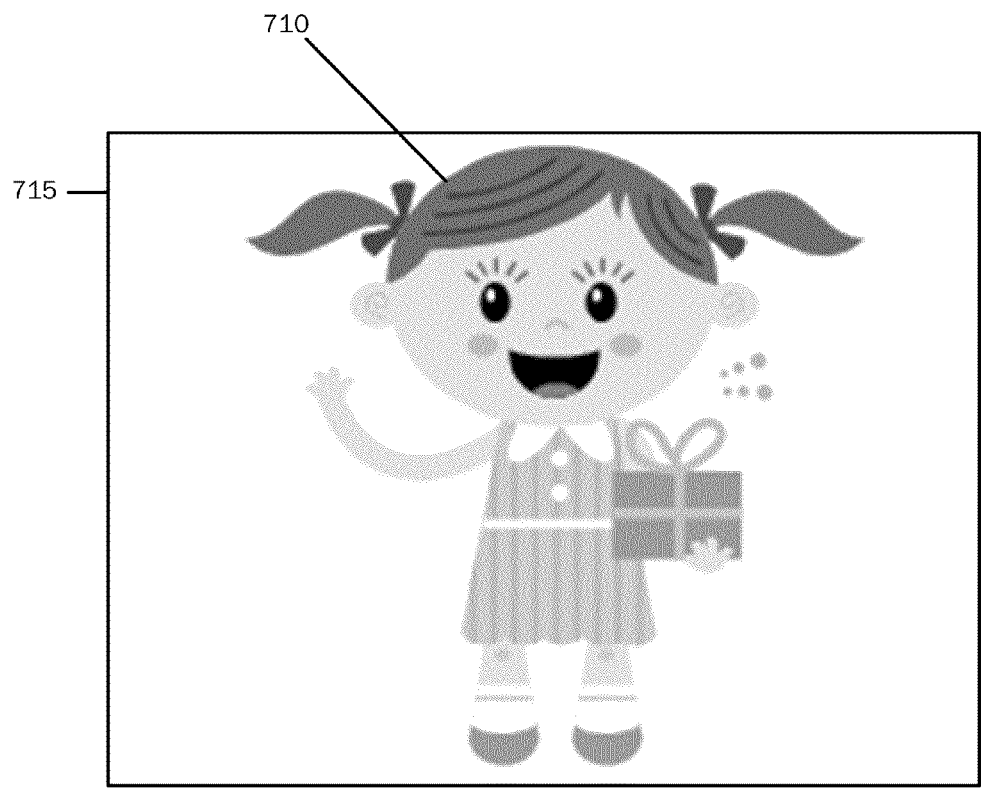
FIG. 7 is a simplified block diagram of a displayed image for describing animation functionality that may be applied to the displayed image.
Figure 8:
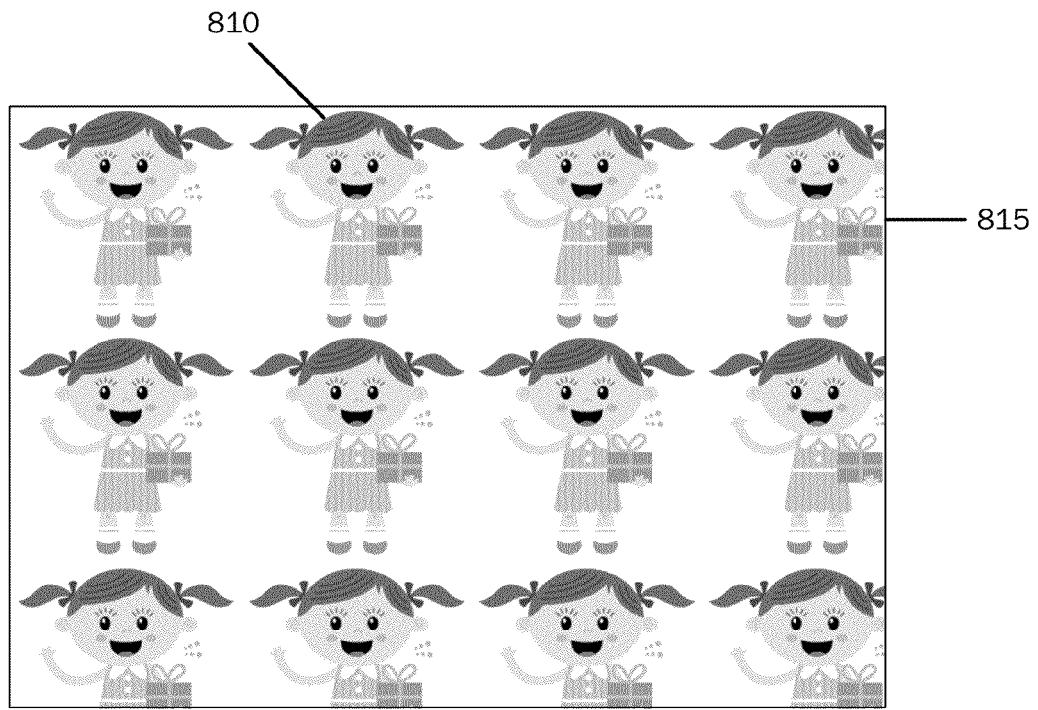
FIG. 8 is a simplified block diagram of a displayed image for describing animation functionality that may be applied to the displayed image.
Figure 9:
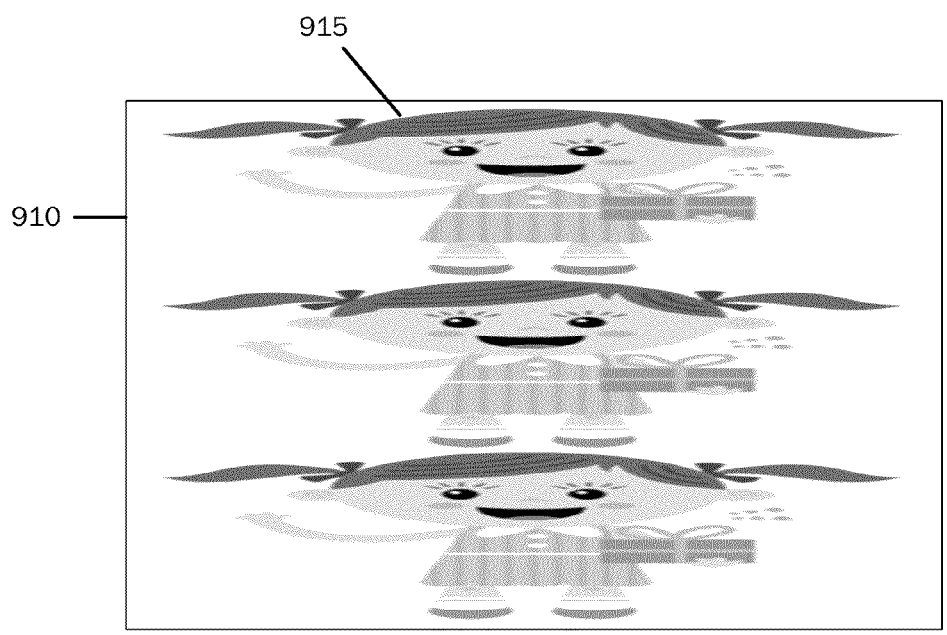
FIG. 9 is a simplified block diagram of a displayed image for describing animation functionality that may be applied to the displayed image.
Figure 10:
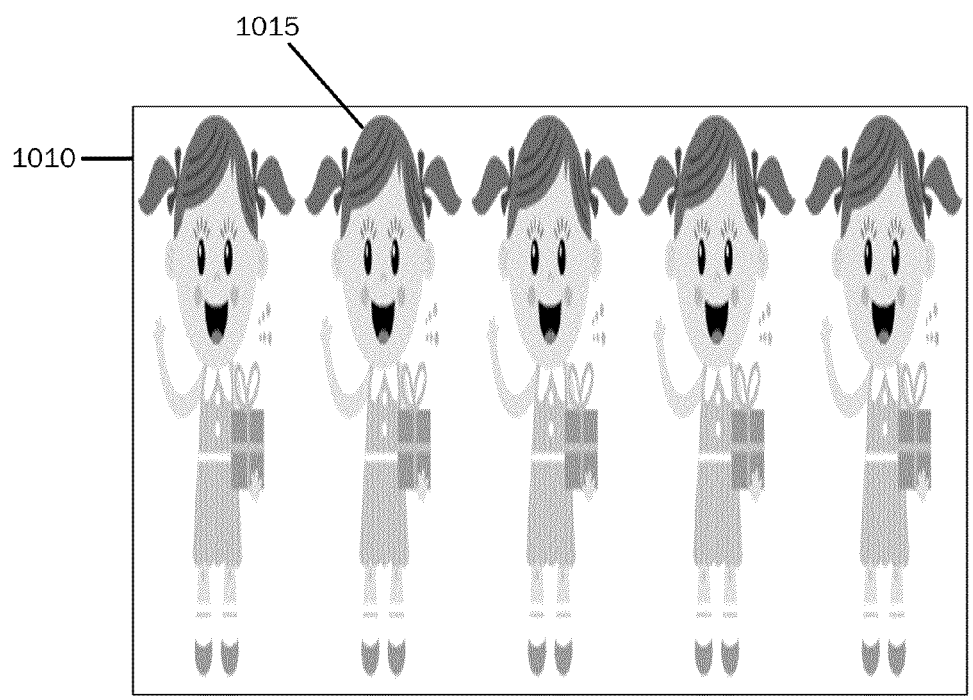
FIG. 10 is a simplified block diagram of a displayed image for describing animation functionality that may be applied to the displayed image.

Referring now to FIGS. 7-10, display component or texture stretch modes may be employed for specifying how a display component may stretch to the bounds of the layer onto which it is placed. Referring to FIG. 7, use of a "stretch" mode allows for a display component 715 to be stretched both vertically and horizontally to fill its layer 710. Referring to FIG. 8, a "tile" mode allows for a display component 815 to maintain its size but to be replicated into a tile display format to fill its layer 810. Referring to FIG. 9, a "stretchhorizontally" mode allows for a display component 915 to stretch horizontally and to tile vertically to fill its layer 910. Referring to FIG. 10, a "stretchvertically" mode allows for a display component 1015 to stretch vertically and to tile horizontally to fill its layer 1010. As should be appreciated, the stretch modes illustrated in FIGS. 7-10 are for purposes of example only and are not limiting of other stretch modes that may be employed (e.g., diagonal stretching, and the like).

According to embodiments, when adding a display component to a layer, the layer can automatically be resized to the size of the display component, assuming it is only constrained on one side in each dimension. This will be ignored if a layer is doubly constrained in any dimension, or if the display component type does not provide a size. In this case, the display component will not be stretched and will fit within the bounds of its layer. However if the layer is later resized, the display component will stretch to fit the layer following a stretch mode applied to the layer.

Figure 11:
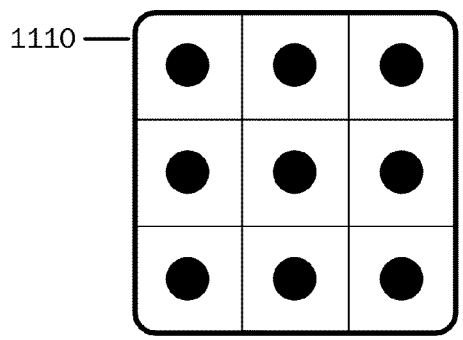
FIG. 11 is a simplified block diagram of a multi-grid bitmap for describing scaling functionality during animation of a displayed object.
Figure 11:
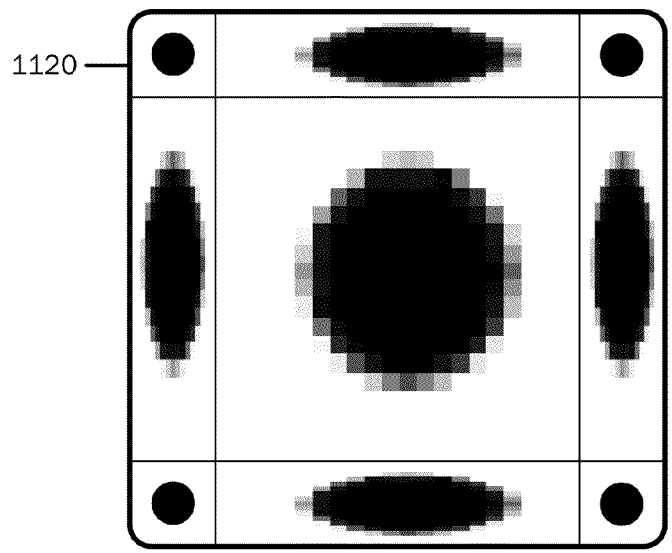
Figure 11:
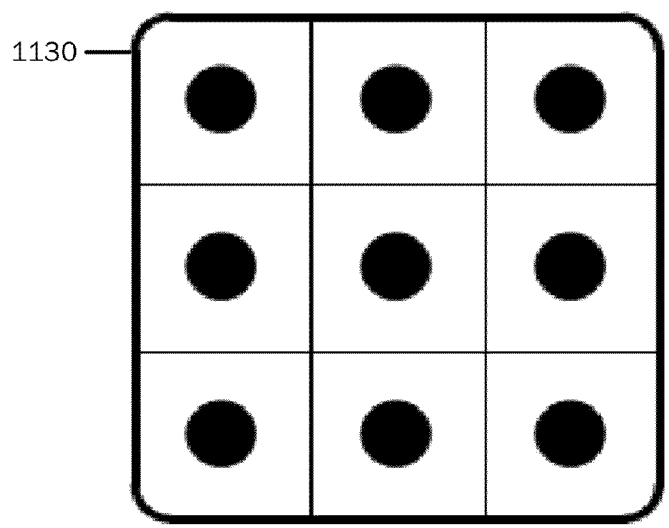

Referring now to FIG. 11, according to embodiments, nine-grid bitmaps configurations may be employed by the animation engine 160 for providing the stretch and movement modes described above with reference to FIGS. 7-10. Setting the nine grid margins illustrated in grids 1110, 1120 and 1130 allows parts of a single display component (e.g., a bitmap) to scale differently when resized to allow for the various stretching and movements illustrated above. For example, referring to grid 1120, when nine-grid margins are set, the corners may not scale at all, the top and bottom areas scale only horizontally, the left and right areas scale only vertically, and the center area scales both horizontally and vertically.

According to embodiments, a stretch mode may be used in conjunction with nine-grid margins, wherein only the portions of the bitmap that are scaled may be affected. For example, a button on a user interface with rounded corners may be enabled where corners of the button (display object) do not scale even though the center of the button does. Thus, the stretch modes described above may be used in conjunction with nine-grid margins illustrated in FIG. 11 to achieve desired display results. According to one embodiment, a display component's default state for the nine-grid margins are all set to 0, as illustrated in grid 1110, and its stretch mode is set to "stretch," as illustrated above in FIG. 7.

Figure 12:
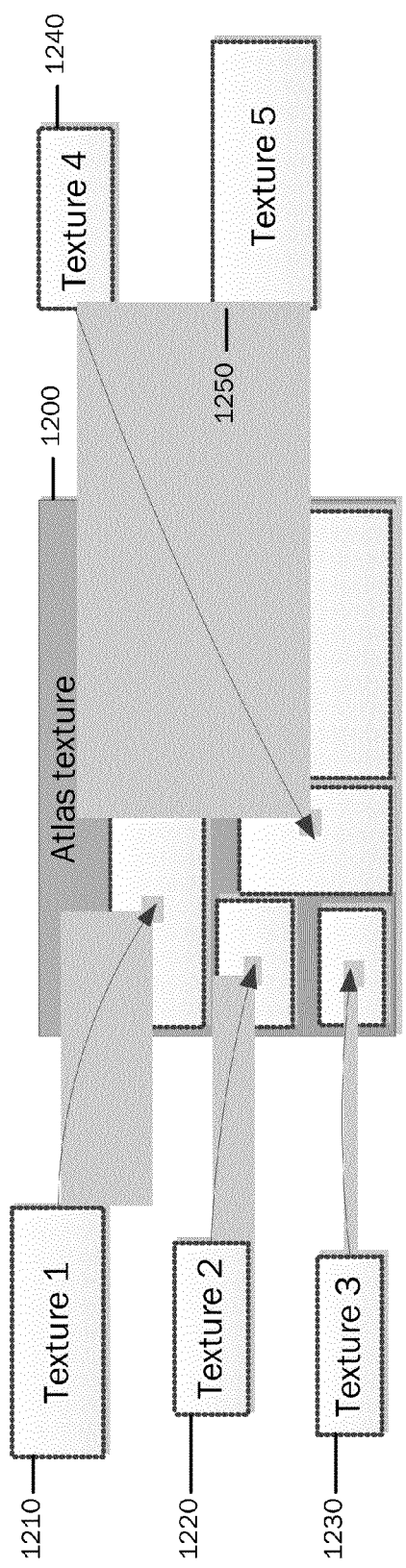
FIG. 12 is a simplified block diagram of a display component (or texture) atlas that may contain a number of display components that can be displayed independently.

FIG. 12 illustrates a collection of display components or textures grouped together in a display component grouping or atlas. As described herein, for a given displayed user interface or content item, a number of individual display components (also referred to herein as textures) 1210, 1220, 1230, 1240, 1250 may be generated and displayed. According to one embodiment, in order to reduce the impact of the time associated with the generation and display of individual display components or textures, a grouping of display components or textures may be assembled together in a single display component grouping or atlas 1200. For example, referring back to FIG. 2, each of the individual buttons or controls 120 displayed in a functionality frame, window or tool bar for the example user interface may be grouped together in a single display component atlas.

According to embodiments then, the use of display component or texture atlases 1200, as illustrated in FIG. 12, allows for performance optimization of the animation engine 160. For example, instead of having 100 20×20 bitmaps, one large surface (atlas) may be created that contains all the 20×20 bitmaps. Then, the animation engine 160 may render different display components from different parts of the larger surface. Such use of the atlas 1200 avoids individual display component creation time (e.g., 1-20 milliseconds more to complete). As should be appreciated, different drivers may have different memory allocation policies where some have minimum allocations meaning if a display component is less than a minimum allocation, the graphics driver will still allocate the minimum amount of memory for a given display component. Thus, all display components assigned to a given atlas may be rendered from one large atlas surface instead of many different surfaces associated with each display component.

Figure 13:
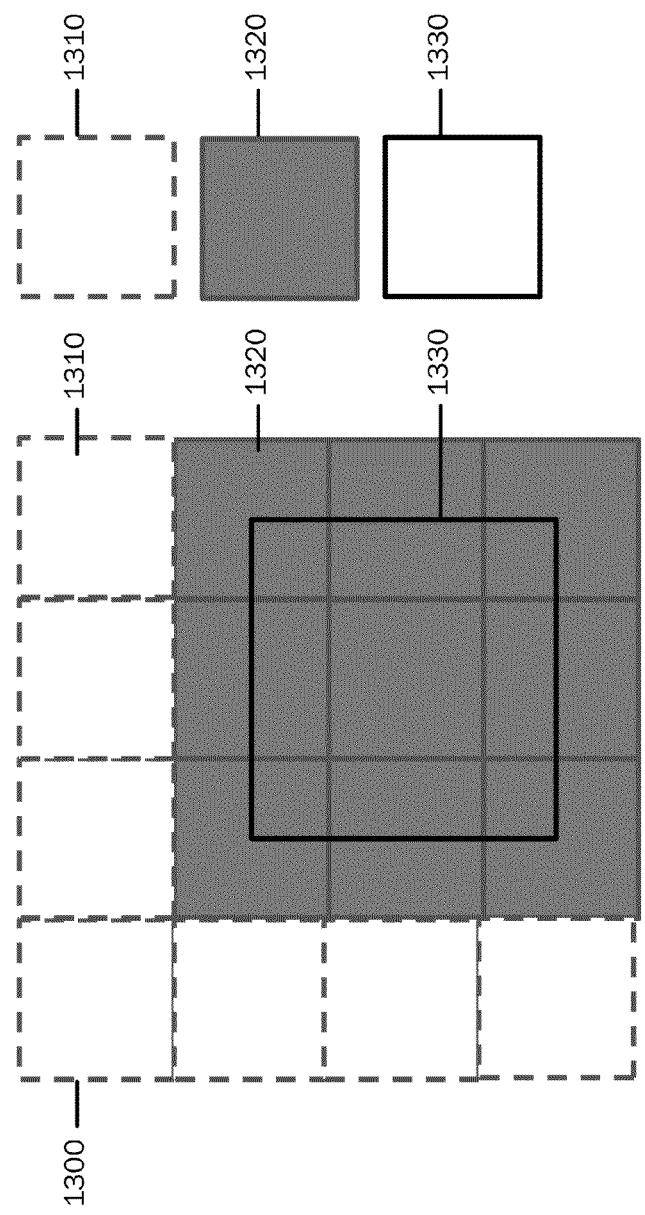
FIG. 13 is a simplified block diagram of a virtual display component or texture comprising a set of tiles which may or may not be visible depending on animation display requirements.

FIG. 13 is a simplified block diagram of a virtual display component or texture comprising a set of tiles which may or may not be visible depending on animation display requirements. In many cases, an application may have a single layer whose size is greater than the maximum size of a texture allowed by the video card. According to embodiments, if a display component or texture is very large, and the user does not need to see the entire display component, then there is no need to render the whole display component and use all the required memory space and processing resources. For example, if a word processing document is zoomed by the user to 500% zoom level such that the user is only seeing a small portion of the document, then there is no need to generate and store display components of portions of the document not in view. As illustrated in FIG. 13, a virtual display component or texture 1300 is generated that represents the entire display component (e.g., document), but that is broken in to a number of tiles 1310, 1320. The tiles illustrated in FIG. 13 are but one example of many different tile shapes and layouts that may be used according to this embodiment. According to one embodiment, the tiles may be in the form of square-shaped tiles. According to embodiments, the animation engine 160 asks the client application (e.g., word processing application) to draw only those tiles that are in a visible region 1330. As tiles outside the visible region 1330 begin to come into view (e.g., via scrolling or zoom), the animation engines calls the application responsible for rendering and requests rendering of the additional tiles.

As described herein, in order to animate a given display component, including positioning of the component, movement of the component, sizing of the component, and the like is accomplished by changing one or more animation properties to the layer onto which the display component is deposited for rendering. According to embodiments, a number of animation properties may be applied to a given display layer. A position property may be applied such that display component and layer position is controlled by constraints which specify how a layer is positioned relative to its parent. A rotation property may be applied which can specify rotation in both two-dimensional display and three-dimensional display. A size property may be applied with which constraints may be specified to control how a layer is sized relative to either itself or its parent. When a layer's size is changed, its child layers will resize based on their constraints relative to the changed parent's constraints.

A scale property may be applied that allows a layer to be resized from a specified center point. Scaling a layer is different from resizing it as child layer constraints will be ignored causing them to scale equally with their parent. A visibility property may be set to render a layer as either visible or invisible. This will not affect opacity. An opacity property may set the degree to which light is allowed to travel through a layer. This property may be animated to create fade effects. A texture property may allow for changes to a display component via cross fades. A scroll property may be set to allow scrolling of one layer relative to another layer. A zoom property may be set for allowing zoom effects as describe herein with respect to FIGS. 7-11 and 13. A bitmap frame property may be set on a layer and allows for an animation of the associated display component. For example, an emptying hour glass or spinning circle may include a number of frames that cycle in a loop during a given processing step.

After properties are set on a given layer, animation of the layer (e.g., movement, resizing, alteration, etc.) may be performed according to different methods. According to a first method animation classes may be set on layers that specify animations that may be applied to a layer's animation events. That is, when a layer is created, an animation class may be applied to the layer that specifies the animation properties described above that are applicable to the layer and the animation behaviors to be followed when these properties change. If an animation property for a layer is changed, then the layer will be animated according to the animation behaviors specified by the layer's class. According to an embodiment, the animation classes, properties and descriptions of how to animate those properties are defined using a declarative markup language such as the Extensible Markup Language (XML).

According to alternate animation method, animation of a layer in a manner not specified by the properties of the layer, followed by a return to the original state of the layer. For example, if it is desired to temporarily change the color of an object to highlight the object, the color may be temporarily changed and then the layer may be returned to its original state according to the properties applied to the layer. For example, a description of the temporary color change may be structured according to XML. The animation engine may cause the XML-based description to be rendered, followed by a return back to the properties still applied to the layer (e.g., go back to the original color of the object).

Prior to the start of an animation, the starting and ending points (also referred to as "key frames") of an animation are defined. According to one embodiment, the key frames may be described via XML. The key frames specify the effective layer properties to be animated for any given layer and how these properties should be animated. For example, a key frame may specify the relative value of the property at each key frame, the time of the key frame, and the timing function or acceleration function that should be used to animate to the relative property value specified by the key frame. Consider for example, a layer is moving from point A to point B. According to this example, A is in its initial property state so it may not need a key frame. For position B, a key frame could be added that might specify a movement of the layer to position B in 400 milliseconds. The key frame might also specify a timing curve which gives the movement a given acceleration. Thus, the property execution would start, accelerate according to the specified acceleration and reach the final value of the property (e.g., position B) in 400 milliseconds.

Figure 14:
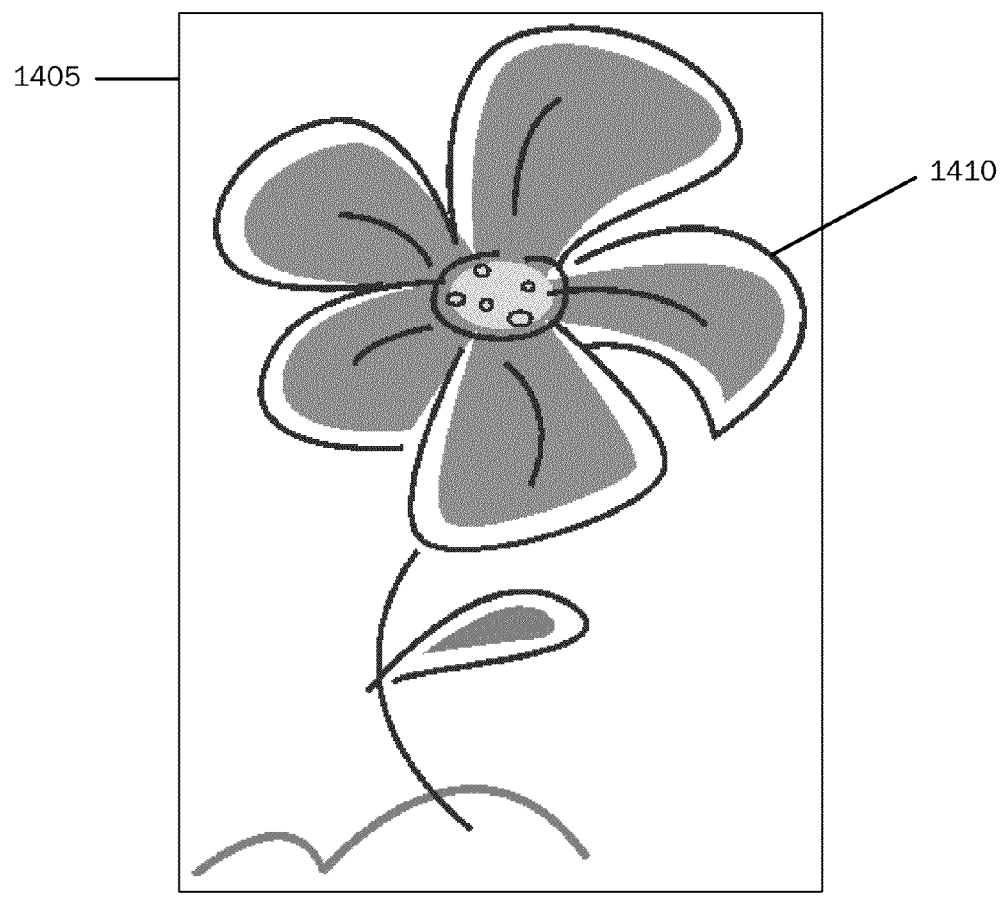
FIG. 14 is a simplified block diagram of a displayed image for describing animation functionality that may be applied to the displayed image.

As described above, various animation classes may be developed and may be described, for example, via a declarative markup language such as XML. Once various animation classes are developed, they may be stored in a central repository or library and may be reused as often as needed on one or more display layers. Referring now to FIG. 14, a number of animation classes are described. However, it should be appreciated that the following list of animation classes is for purposes of illustration only and is not limiting of the vast number of other animation classes that may be developed and applied to a layer for causing desired animation of the layer.

Referring then to FIG. 14, an animation class may contain an "OnShow" animation that specifies how the layer should animate when its visibility property is set to true. This class may be applied to the layer 1405 and associated display component 1410. When the layer 1405 later becomes visible, the "OnShow" animation may be triggered causing layer 1405 and associated display component 410 to fade into view. The animation class applied to layer 1405 may also contain an "OnHide" animation that specifies how the layer should animate when its visibility property is set to false. When the visibility of layer 1405 is set to false, the "OnHide" animation is triggered causing layer 1405 and associated display component 1410 to fade out of view. The animation class applied to layer 1405 may also contain an "OnMove" animation that specifies how the layer should animate when its position property is changed. If the position of layer 1405 is changed, the "OnMove" animation may be triggered causing the layer to animate to its new position. If the animation class applied to layer 1405 contains an "OnResize" animation that specifies how the layer should animate when its size is changed, then the layer will follow the specified animation when its size property is changed as follows. When the layer is resized according to changes in size constraints, and on resizing a layer, its child layers may be resized based on their applied constraints relative to the parent layer following the "OnResize" animation.

If the class applied to layer 1405 contains an "OnOpacityChanged" animation, this animation may be triggered on layer 1405 and associated display component 1410 when the opacity of the layer 1405 is changed. If the class applied to layer 1405 contains an "OnTextureChanged" animation that specifies a cross fade animation to be applied when the layer's texture is changed, the layer may cross fade between textures when the texture is updated. If the class applied to layer 1405 contains an "OnScale" animation, this animation may be triggered when the layer's scale is changed. Scaling a layer is different from resizing it. Scaling allows a center point to scale from to be identified and ignores constraints scaling all child layers equally.

If the class applied to layer 1405 contains an "OnRotate" animation, this animation may be triggered when the layer is rotated. An "OnAlways" animation may be included in the class that is applied to layer 1405 to specify a looping animation. Animations applied to an "OnAlways" event will be temporarily overridden by animations triggered by other layer events. An "OnAlways" animation can be stopped by either disabling animations on a layer or by removing the class that defines the "OnAlways" animation from the layer. An "OnScroll" animation may be included in a class that can be applied to layers created as scrolling layers. Like other layer properties, when a change is made, an event is triggered. For example, when the layer scrolls to a new position, the "OnScroll" animation may be triggered. An "OnZoom" animation may be included in a class applied to a layer 1405 created as a scrolling layer. This event is triggered when the layer zooms to a new position.

According to embodiments, if new animations are scheduled which change the value of a layer property which is currently being animated, the new animation will override the currently running animation. In this case, the layer will stop animating towards the original property value and will change to animate towards the new property value. Overriding animations ensures the animation engine 160 is responsive to user input. For example, if an animation is running in a document and a user selects a function button, such as "print," the document display component will immediately animate into the background subordinate to the animation associated with the selected "print" button.

Figure 15A:
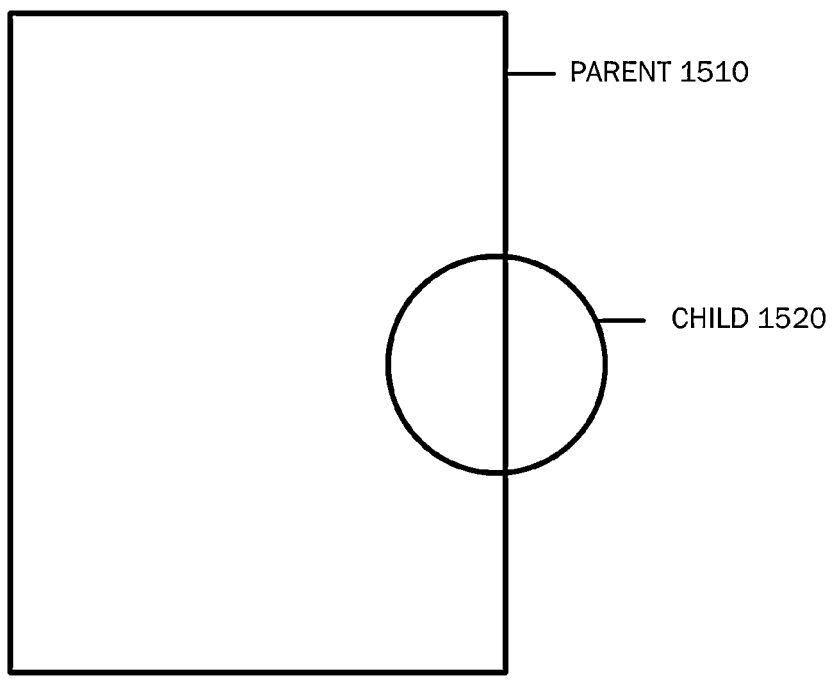
FIGS. 15A and 15B are simplified block diagrams illustrating animation of a child display component or object relative to a parent display component or object.
Figure 15B:
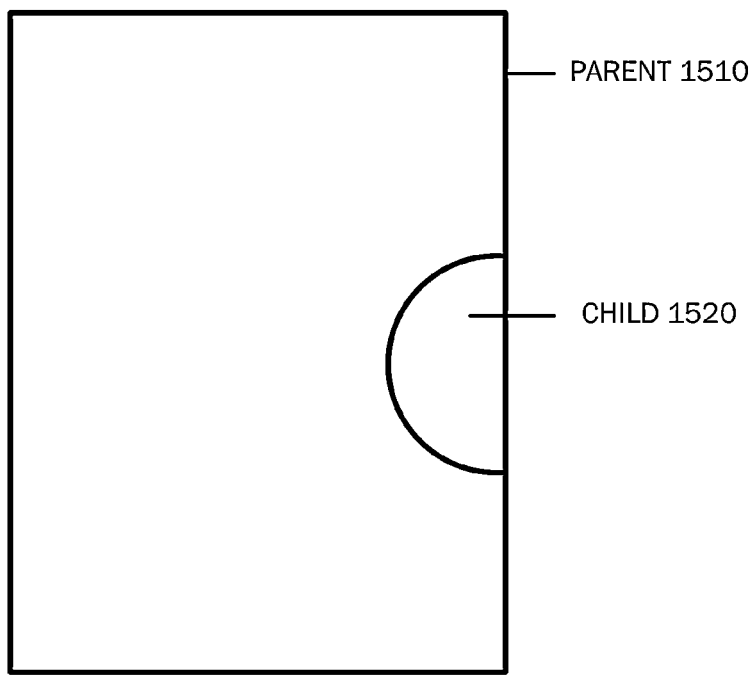
Figure 16:
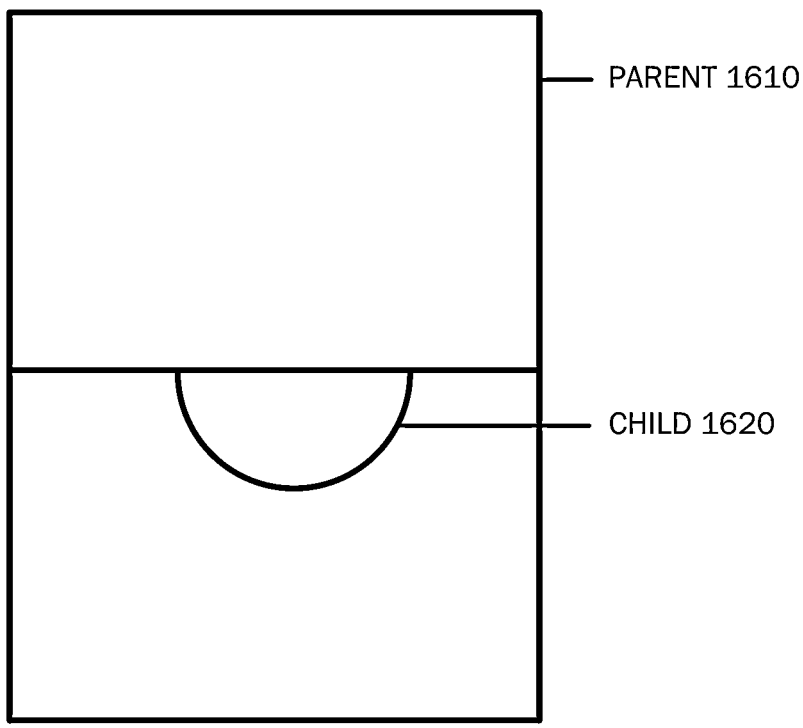
FIG. 16 is a simplified block diagram illustrating animation of a child display component or object relative to a parent display component or object.

FIGS. 15A, 15B and 16 are simplified block diagrams illustrating animation of a child display component or object relative to a parent display component or object where in clipping is illustrated. Referring to FIG. 15A, by default, if a child layer 1520 moves outside the bounds of the parent layer 1510 it will not be clipped (i.e., the child layer will be displayed even outside the parent layer bounds). On the other hand, as illustrated in FIG. 15B, a property may be set on the child layer 1520 so that if it moves outside the bounds of the parent layer 1510, the child layer will be clipped from view for the portion outside the parent layer bounds. As illustrated in FIG. 16, a vertically aligned parent layer 1610 may clip its child layer 1620.

As described herein, animation is behavior based where the animation applied to a layer controls the animation behavior of the layer when layer properties are changed. As described above, these behaviors define how visual display components (elements) move, rotate, resize, scale, show, hide, change in opacity, zoom and scroll. For example, a developer of a word processing application implementation can assign animation behaviors to a visual element containing text. These behaviors will define how the text moves and grows. After the animation behaviors have been assigned, if the word processing application changes the text by moving or resizing, it will cause the text to automatically animate following the newly applied animation behaviors. According to one embodiment, the animation behaviors applied to display layers are XML-based. The XML-based animation behaviors define timing, animations and classes.

Figure 17:
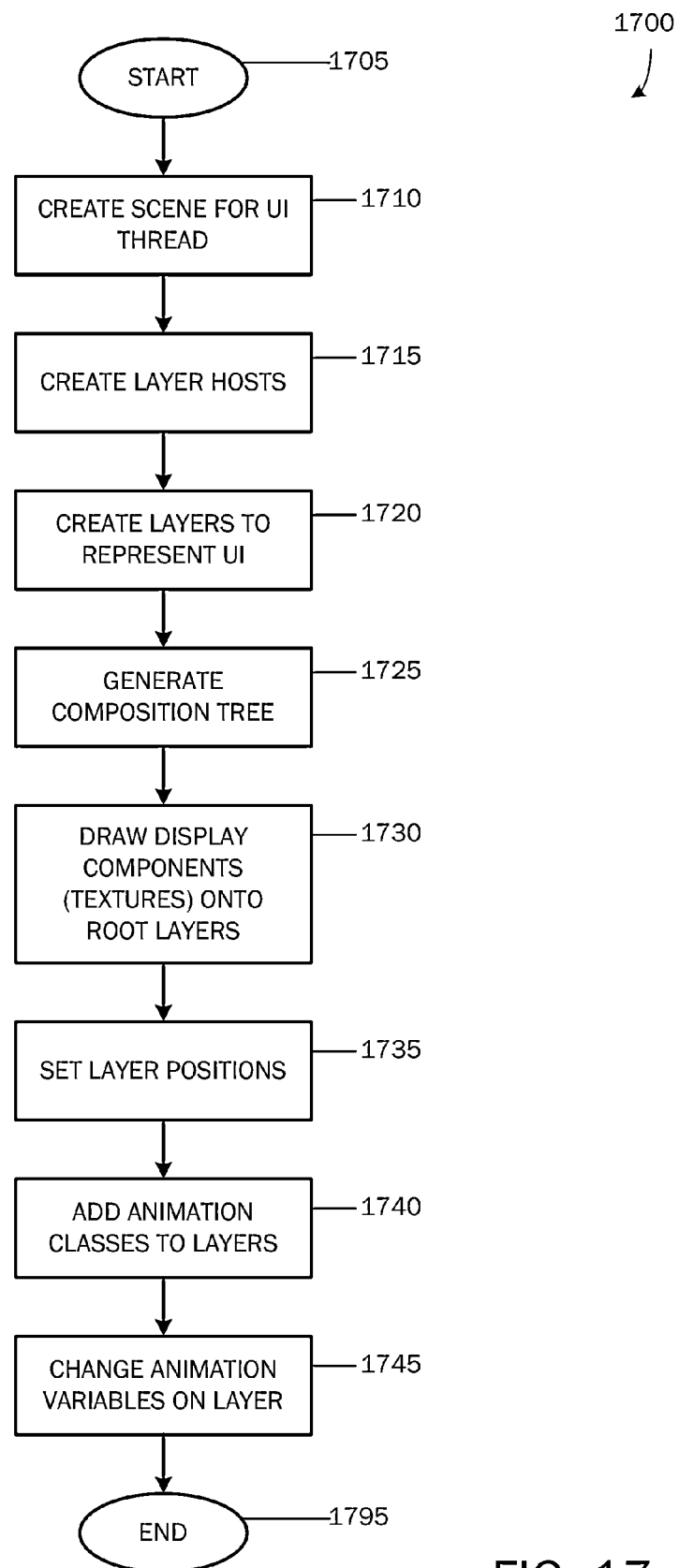
FIG. 17 is a flow diagram illustrating a method of animation of computer-generated display components of user interfaces and content items.

FIG. 17 is a flow chart illustrating a method for providing animation of or in association with one or more graphical display components. The method 1700 begins at start operation 1705 and proceeds to operation 1710 where a compositor application 171 of the animation engine 160 creates a scene for the user interface (UI) thread 165. According to embodiments, the compositor application 171 brings visual display components or elements (also referred to herein as "textures") from different sources together in order to create a combined scene which can be animated. Each UI thread 165 has one scene that represents the state of the compositor application 171 on that thread. The scene can be used to create layer hosts, layers, textures and other compositor application objects. In addition the scene provides functions that effect all animations that occur on the scene's thread.

At operation 1715, the compositor application 171 uses the scene to create layer hosts to take over rendering for display frames or windows in the scene. A layer host is an object that takes over rendering for a display frame or window and creates a root layer. There can be multiple layer hosts in a scene.

At operation 1720, layers required for representing a desired user interface component or content component are created. That is, a root layer and as many parent and child layers under the root layer as are needed for displaying desired display components are created. At operation 1725, a composition tree is generated establishing a relationship between the created layers, including assignment of indexes to each layer for determining the animation orders of the various layers. The composition tree is set up by retrieving the root layer from an applicable layer host and by adding layers to be animated as children of the root layer.

At operation 1730, display components, for example buttons, controls, text items, photographs, images, charts, etc., are drawn onto the applicable layers. Initially, layers are transparent and do not draw anything to the display surface. When a display component is added to a layer, the layer's "Texture" property is set. According to one embodiment, the display components are converted to bitmaps, and the bitmaps are drawn to the applicable layers. At operation 1735, the position of child layers are set relative to parent layers based on animation properties applied to the parent and child layers.

At operation 1740, animation classes, as described above with reference to FIG. 14, are set on the parent and child layers. Adding an animation class to a layer associates animations with changes to the layer's variables and events that may be animated, such as movements, size changes, etc. At operation 1745, layer properties or variables are changed (e.g., a variable requiring a movement of a layer from point A to point B). The changes trigger associated events (e.g., a movement of a layer), and appropriate animations are scheduled according to the animation class definitions applied to the layers. The method 1700 ends at operation 1795

Figure 18:
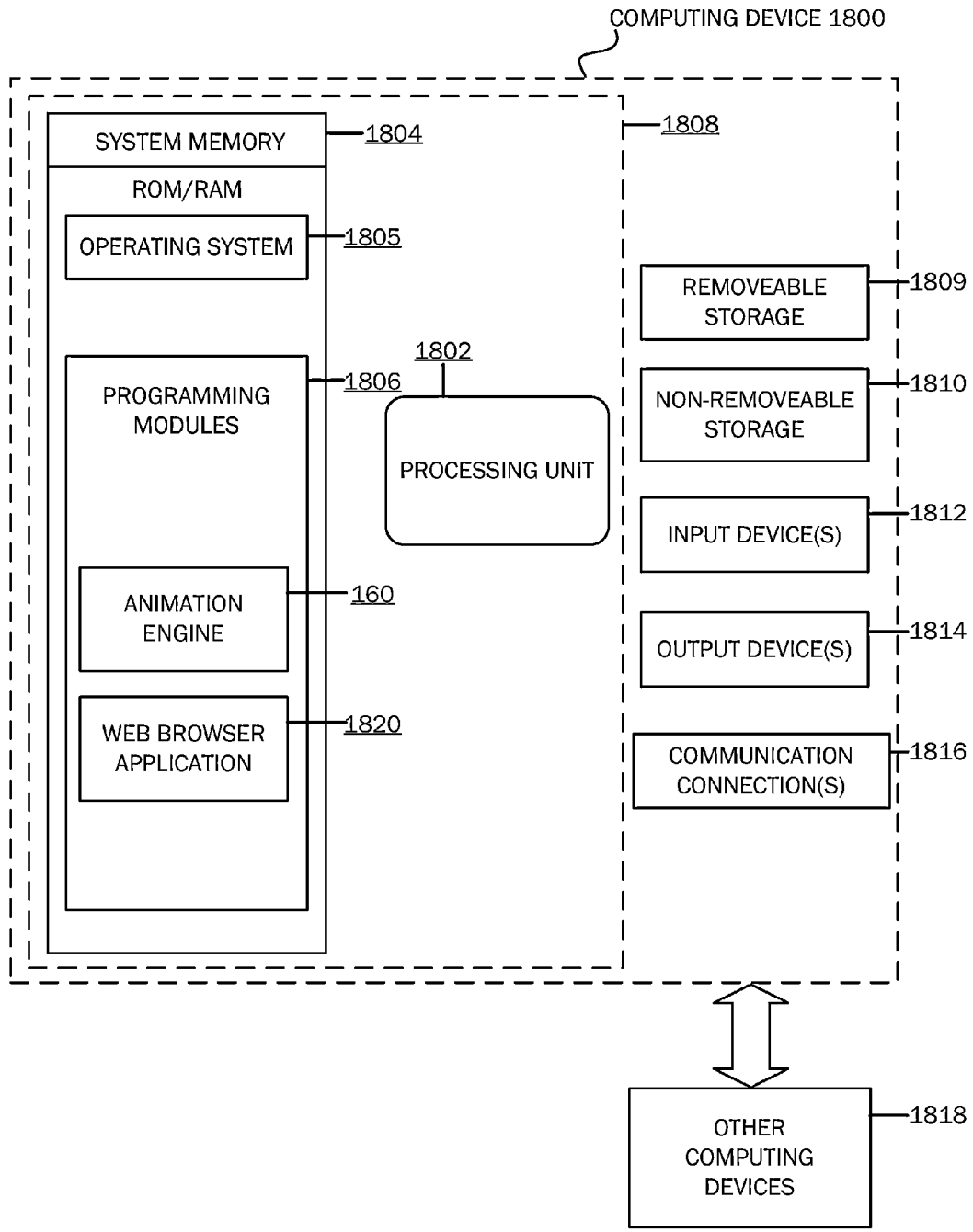
FIG. 18 is a simplified block diagram of a computing device with which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 18-20 and the associated descriptions provide a discussion of a variety of operating environments in which embodiments of the invention may be practiced. However, the devices and systems illustrated and discussed with respect to FIGS. 18-9 are for purposes of example and illustration and are not limiting of a vast number of computing device configurations that may be utilized for practicing embodiments of the invention, described herein.

FIG. 18 is a block diagram illustrating example physical components of a computing device 1800 with which embodiments of the invention may be practiced. The computing device components described below may be suitable for the computing devices described above. In a basic configuration, computing device 1800 may include at least one processing unit 1802 and a system memory 1804. Depending on the configuration and type of computing device, system memory 1804 may comprise, but is not limited to, volatile (e.g. random access memory (RAM)), non-volatile (e.g. read-only memory (ROM)), flash memory, or any combination. System memory 1804 may include operating system 1805, one or more programming modules 1806, and may include a web browser application 1820. Operating system 1805, for example, may be suitable for controlling computing device 1800's operation. In one embodiment, programming modules 1806 may include an animation engine 160, as described above with reference to FIG. 1A, installed on computing device 1800. Furthermore, embodiments of the invention may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computing device 1800 may also contain a communication connection 1816 that may allow device 1800 to communicate with other computing devices 1818, such as over a network in a distributed computing environment, for example, an intranet or the Internet. Communication connection 1816 is one example of communication media.

As stated above, a number of program modules and data files may be stored in system memory 1804, including operating system 1805. While executing on processing unit 1802, programming modules 1806, such as the animation engine 160 may perform processes including, for example, one or more method 1700's stages as described above. The aforementioned process is an example, and processing unit 1802 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 18 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the application 160 may be operated via application-specific logic integrated with other components of the computing device/system 1800 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, etc. Output device(s) 1814 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 19A:
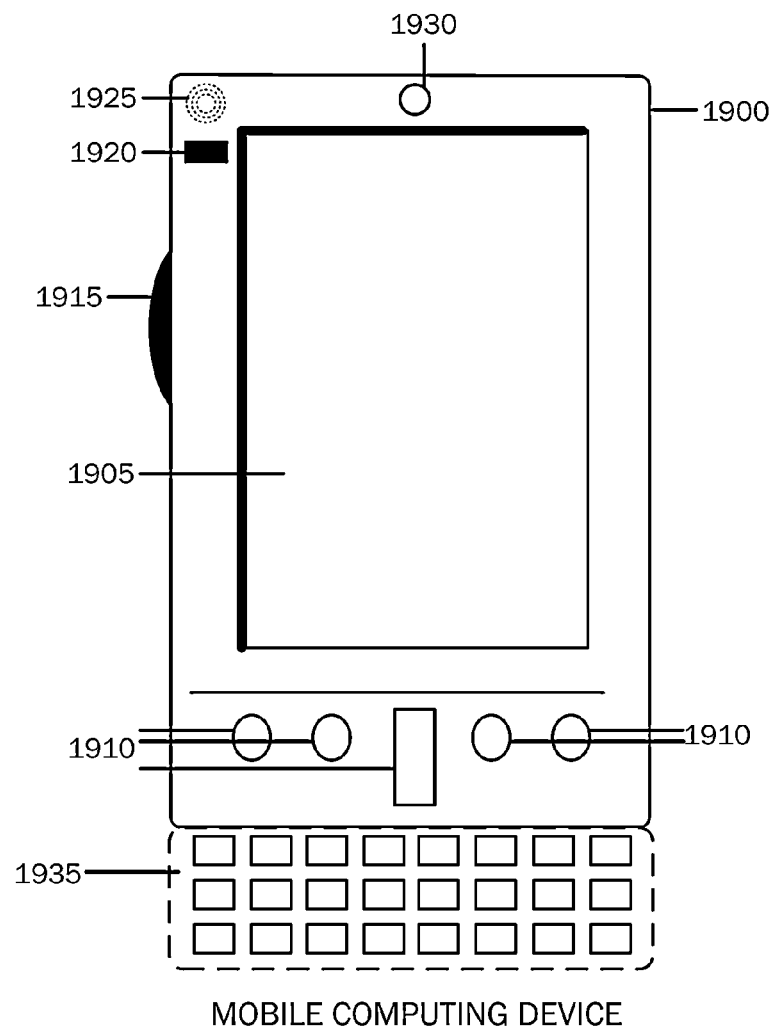
FIGS. 19A and 19B are simplified block diagrams of a mobile computing device with which embodiments of the present invention may be practices.
Figure 19B:
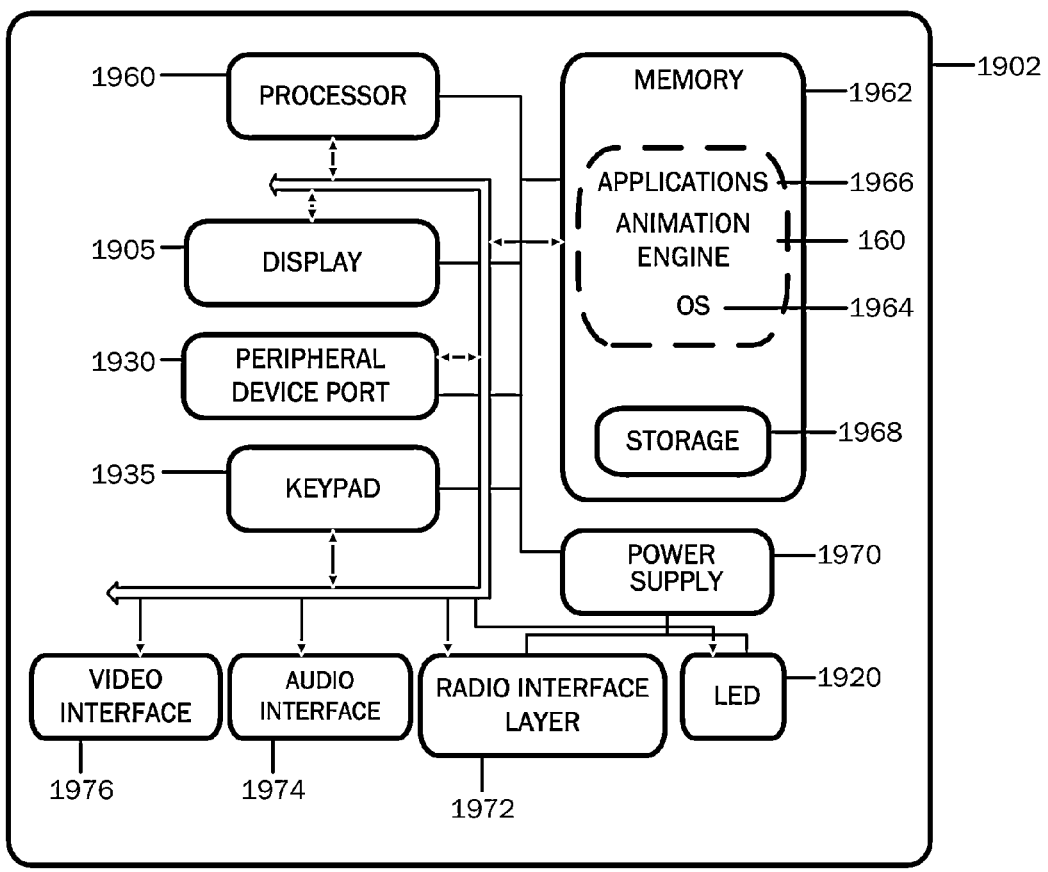
Figure 20:
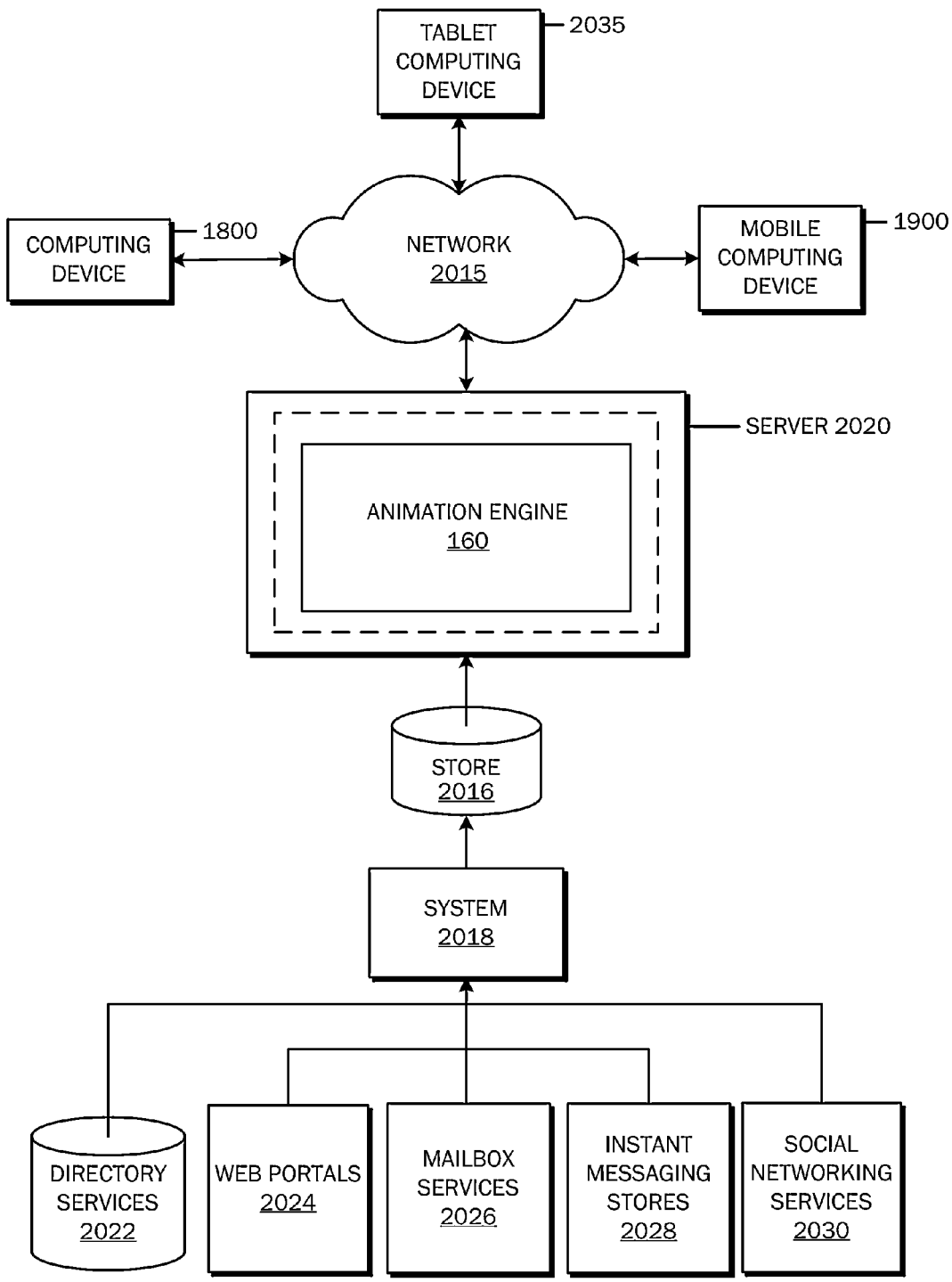
FIG. 20 is a simplified block diagram of a distributed computing system in which embodiments of the present invention may be practiced.

FIGS. 19A and 19B illustrate a suitable mobile computing environment, for example, a mobile telephone 1900, a smartphone, a tablet personal computer, a laptop computer, and the like, with which embodiments of the invention may be practiced. With reference to FIG. 19A, an example mobile computing device 1900 for implementing the embodiments is illustrated. In a basic configuration, mobile computing device 1900 is a handheld computer having both input elements and output elements. Input elements may include touch screen display 1905 and input buttons 1915 that allow the user to enter information into mobile computing device 1900. Mobile computing device 1900 may also incorporate an optional side input element 1915 allowing further user input. Optional side input element 1915 may be a rotary switch, a button, or any other type of manual input element. In alternative embodiments, mobile computing device 1900 may incorporate more or less input elements. For example, display 1905 may not be a touch screen in some embodiments. In yet another alternative embodiment, the mobile computing device is a portable phone system, such as a cellular phone having display 1905 and input buttons 1910. Mobile computing device 1900 may also include an optional keypad 1935. Optional keypad 1935 may be a physical keypad or a "soft" keypad generated on the touch screen display.

Mobile computing device 1900 incorporates output elements, such as display 1905, which can display a graphical user interface (GUI). Other output elements include speaker 1925 and LED light 1920. Additionally, mobile computing device 1900 may incorporate a vibration module (not shown), which causes mobile computing device 1900 to vibrate to notify the user of an event. In yet another embodiment, mobile computing device 1900 may incorporate a headphone jack (not shown) for providing another means of providing output signals.

Although described herein in combination with mobile computing device 1900, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 19B is a block diagram illustrating components of a mobile computing device used in one embodiment, such as the computing device shown in FIG. 19A. That is, mobile computing device 1900 can incorporate system 1902 to implement some embodiments. For example, system 1902 can be used in implementing a "smart phone" that can run one or more applications similar to those of a desktop or notebook computer such as, for example, browser, e-mail, scheduling, instant messaging, and media player applications. In some embodiments, system 1902 is integrated as a computing device, such as an integrated personal digital assistant (PDA) and wireless phone.

One or more application programs 1966 may be loaded into memory 1962 and run on or in association with operating system 1964. Examples of application programs include phone dialer programs, e-mail programs, PIM (personal information management) programs, word processing programs, spreadsheet programs, Internet browser programs, messaging programs, and so forth. System 1902 also includes non-volatile storage 1968 within memory 1962. Non-volatile storage 1968 may be used to store persistent information that should not be lost if system 1902 is powered down. Applications 1966 may use and store information in non-volatile storage 1968, such as e-mail or other messages used by an e-mail application, and the like. A synchronization application (not shown) also resides on system 1902 and is programmed to interact with a corresponding synchronization application resident on a host computer to keep the information stored in non-volatile storage 1968 synchronized with corresponding information stored at the host computer. As should be appreciated, other applications may be loaded into memory 1962 and run on the device 1900, including the animation engine 160, described above with reference to FIG. 1A.

System 1902 has a power supply 1970, which may be implemented as one or more batteries. Power supply 1970 might further include an external power source, such as an AC adapter or a powered docking cradle that supplements or recharges the batteries.

System 1902 may also include a radio 1972 that performs the function of transmitting and receiving radio frequency communications. Radio 1972 facilitates wireless connectivity between system 1902 and the "outside world", via a communications carrier or service provider. Transmissions to and from radio 1972 are conducted under control of OS 1964. In other words, communications received by radio 1972 may be disseminated to application programs 1966 via OS 1964, and vice versa.

Radio 1972 allows system 1902 to communicate with other computing devices, such as over a network. Radio 1972 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1902 is shown with two types of notification output devices; LED 1920 that can be used to provide visual notifications and an audio interface 1974 that can be used with speaker 1925 to provide audio notifications. These devices may be directly coupled to power supply 1970 so that when activated, they remain on for a duration dictated by the notification mechanism even though processor 1960 and other components might shut down for conserving battery power. LED 1920 may be programmed to remain on indefinitely until the user takes action to indicate the powered-on status of the device. Audio interface 1974 is used to provide audible signals to and receive audible signals from the user. For example, in addition to being coupled to speaker 1925, audio interface 1974 may also be coupled to a microphone to receive audible input, such as to facilitate a telephone conversation. In accordance with embodiments of the present invention, the microphone may also serve as an audio sensor to facilitate control of notifications, as will be described below. System 1902 may further include video interface 1976 that enables an operation of on-board camera 1930 to record still images, video stream, and the like.

A mobile computing device implementing system 1902 may have additional features or functionality. For example, the device may also include additional data storage devices (removable and/or non-removable) such as, magnetic disks, optical disks, or tape. Such additional storage is illustrated in FIG. 19B by storage 1968. Computer storage media may include volatile and nonvolatile, removable and non-removable media implemented in any method or technology for storage of information, such as computer readable instructions, data structures, program modules, or other data.

Data/information generated or captured by the device 1900 and stored via the system 1902 may be stored locally on the device 1900, as described above, or the data may be stored on any number of storage media that may be accessed by the device via the radio 1972 or via a wired connection between the device 1900 and a separate computing device associated with the device 1900, for example, a server computer in a distributed computing network such as the Internet. As should be appreciated such data/information may be accessed via the device 1900 via the radio 1972 or via a distributed computing network. Similarly, such data/information may be readily transferred between computing devices for storage and use according to well-known data/information transfer and storage means, including electronic mail and collaborative data/information sharing systems.

FIG. 20 illustrates a system architecture for providing communications and content associated with an animation engine 160 to various client devices via a distributed computing environment before during or after a work session, as described above. As described previously, an animation engine 160 allows for management of computer-generated display components, including discarding idle display components for memory and processing resources conservation. Display components managed via the animation engine 160 may be stored in different communication channels or other storage types. For example, display components along with information from which they are developed may be stored using directory services 2022, web portals 2024, mailbox services 2026, instant messaging stores 2028 and social networking sites 2030. The systems/applications 160, 2018 may use any of these types of systems or the like for enabling management and storage of display components in a store 2016. A server 2020 may provide communications for managed display components and content to clients. As one example, server 2020 may be a web server providing collaborative display component management communications and content over the web. Server 2020 may provide online display component management and content over the web to clients through a network 2015. Examples of clients that may obtain display component management communications and content include computing device 2000, which may include any general purpose personal computer, a tablet computing device 2035 and/or mobile computing device 1900 which may include smart phones. Any of these devices may obtain display component management communications and content from the store 2016.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method of animating a computer-generated display component, comprising:
    generating one or more display layers for displaying one or more display components on a computer-enabled display surface;
    drawing a display component on each of the one or more display layers;

applying an animation property to each of the one or more display layers;

applying one or more animation behaviors to each of the one or more display layers for enabling animations for each of the one or more display layers when changes are made to animation properties applied to each of the one or more display layers;

receiving a change to one or more animation properties applied to one or more of the display layers;

flattening all display layers that did not receive a change to one or more animation properties into a single non-animating display layer; and animating the one or more display layers for which an animation property change is received according to the one or more animation behaviors applied to the one or more display layers.

2. The method of claim 1, wherein drawing a display component on each of the one or more display layers includes drawing a bitmap image of a display component on each of the one or more display layers.

3. The method of claim 1, wherein applying one or more animation behaviors to each of the one or more display layers includes applying one or more animation behaviors described according to a declarative markup language.

4. The method of claim 3, wherein applying one or more animation behaviors described according to the declarative markup language includes applying one or more animation behaviors described according to an Extensible Markup Language.

5. The method of claim 1, wherein applying one or more animation behaviors to each of the one or more display layers includes applying one or more animation classes to each of the one or more display layers for specifying animations that may be applied to a display layer in response to receiving animation property changes to the display layer.

6. The method of claim 5, wherein the one or more animation classes are stored in a central library and are operable to be re-applied on the one or more display layers.

7. The method of claim 1, wherein the one or more animation behaviors include one or more of movement of a display layer, rotation of a display layer, resizing of a display layer, scaling of a display layer, hiding a display layer, changing the opacity of a display layer, zooming a display layer, scrolling a display layer, and looping an animation of a bitmap on a display layer.

8. The method of claim 1, wherein the one or more animation behaviors include timing functions applied to each of the one or more display layers that specify the velocity and acceleration applied when animating the one or more display layers for which an animation property change is received according to the one or more animation behaviors applied to the one or more display layers.

9. The method of claim 1, wherein the one or more animation behaviors include key frames applied to each of the one or more display layers that define how animation properties of display components drawn to each of the one or more display layers animate between animation states.

10. The method of claim 1, prior to generating one or more display layers for displaying one or more display components on a computer-enabled display surface, further comprising:

generating a display scene for describing the one or more display layers;

generating one or more display frames for receiving one or more of the one or more display layers; and generating, from the display scene, a layer host for each of the one or more display frames for rendering display components onto display layers contained in each of the one or more display frames.

11. The method of claim 10, wherein in response to generating a layer host for each of the one or more display frames, further comprising:

retrieving a root layer from each layer host;

creating a composition tree for each display frame including adding each of the one or more display layers associated with each display frame as child layers to the corresponding root layers; and applying an ordering index to each child layer for determining an animation order of each child layer relative to other child layers.

12. A system for animating a computer-generated display component, comprising:

a processor; and a memory device containing computer executable instructions that when executed by the processor provide:

an animation engine operative to enable animation of computer-generated display components displayed on a computer-enabled display surface;

the animation engine comprising:

a user interface (UI) thread operative to schedule animations on display layers in response to property changes on the display layers;

a compositor thread operative to receive from the UI thread display layers with property changes for generating an animation scheduling communication, and to flatten all display layers without property changes into a single non-animating display layer; and a rendering thread operative to receive the animation scheduling communication from the compositor thread for rendering display components associated with the display layers according to the property changes on the associated display layers.

13. The system of claim 12, wherein the UI thread is further operative to:

create the display layers onto which the display components are rendered;

add display components onto associated display layers;

apply one or more animation behaviors to the associated display layers; and change animation properties on the associated display layers for scheduling animations.

14. A computer readable medium, not including a signal, containing computer executable instructions which when executed by a computer perform a method of animating a computer-generated display component, comprising:

generating a display layer for displaying a display component on a computer-enabled display surface;

drawing a display component on the display layer;

applying an animation property to the display layer;

applying one or more animation behaviors to the display layer for enabling animations for the display layer when changes are made to the animation property applied to the display layer;

sending, from a compositor thread to a rendering thread, a communication containing information required to schedule an animation of the display layer based on the one or more animation behaviors applied to the display layer; and flattening all non-animating display layers into a single non-animating display layer.

15. The computer readable medium of claim 14, further comprising:

receiving a scheduled animation that identifies the display layer to be animated and describes how the identified display layer is to be animated; and animating the identified display layer according to the one or more animation behaviors applied to the identified display layer.

16. The computer readable medium of claim 14, further comprising:

receiving an instruction to disable an animation on the display layer; and disabling the scheduling of a subsequent animation on the display layer.

17. The computer readable medium of claim 14, wherein the one or more animation behaviors include one or more of movement of the display layer, rotation of the display layer, resizing the display layer, scaling the display layer, hiding the display layer, changing the opacity of the display layer, zooming the display layer, scrolling the display layer, and looping an animation of a bitmap on the display layer.

18. The computer readable medium of claim 14, wherein the one or more animation behaviors include timing functions that specify the velocity and acceleration applied when animating the display layers.

19. The computer readable medium of claim 14, wherein the one or more animation behaviors include key frames applied to the display layer that define how properties of a display component drawn to the display layer animate between animation states.

20. The computer readable medium of claim 14, wherein drawing a display component on the display layer includes partially drawing the display component such that only a portion of the display component that is visible at a given time is drawn.

* * * * *